(12) United States Patent
Hino et al.

(10) Patent No.: US 11,114,913 B2
(45) Date of Patent: Sep. 7, 2021

(54) ROTATING ELECTRIC MACHINE

(71) Applicant: Mitsubishi Electric Corporation, Tokyo (JP)

(72) Inventors: Tatsuro Hino, Tokyo (JP); Masashi Nakamura, Tokyo (JP); Kohei Egashira, Tokyo (JP); Hironobu Ogura, Tokyo (JP); Shohei Matsuoka, Tokyo (JP); Shogo Okamoto, Tokyo (JP); Shinichiro Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 120 days.

(21) Appl. No.: 16/609,983

(22) PCT Filed: May 23, 2017

(86) PCT No.: PCT/JP2017/019222
§ 371 (c)(1),
(2) Date: Oct. 31, 2019

(87) PCT Pub. No.: WO2018/216107
PCT Pub. Date: Nov. 29, 2018

(65) Prior Publication Data
US 2020/0091787 A1    Mar. 19, 2020

(51) Int. Cl.
*H02K 3/28* (2006.01)
*H02K 11/25* (2016.01)
(Continued)

(52) U.S. Cl.
CPC ............... *H02K 3/28* (2013.01); *H02K 1/16* (2013.01); *H02K 3/50* (2013.01); *H02K 11/25* (2016.01); *H02K 2203/09* (2013.01)

(58) Field of Classification Search
CPC . H02K 3/28; H02K 11/25; H02K 1/16; H02K 3/50; H02K 2203/09
See application file for complete search history.

(56) References Cited

U.S. PATENT DOCUMENTS 10,263,486 B2 * 4/2019 Nakamura ............... H02K 3/02
10,355,547 B2 * 7/2019 Hino ....................... H02K 1/165
(Continued)

FOREIGN PATENT DOCUMENTS

| JP | 5471867 B2 | 4/2014 |
| JP | 2016-032392 A | 3/2016 |

OTHER PUBLICATIONS

International Search Report for PCT/JP2017/019222 dated, Aug. 1, 2017 (PCT/ISA/237).

*Primary Examiner* — Robert W Horn
(74) *Attorney, Agent, or Firm* — Sughrue Mion, PLLC; Richard C. Turner

(57) ABSTRACT

In the rotating electric machine, a first terminal and a second terminal extend from two of the slots and a third terminal extends from one of the slots, which is located between the two slots. The first terminal and the second terminal are connected to each other with use of a bus bar. The bus bar has: a first end portion to be connected to a distal end portion of the first terminal; a second end portion to be connected to a distal end portion of the second terminal; and an interconnecting portion configured to couple the first end portion and the second end portion to each other, which is arranged in the circumferential direction on the stator core side of the first end portion and the second end portion so as to pass on the slot side of the third terminal.

9 Claims, 18 Drawing Sheets

(51) Int. Cl.
*H02K 1/16* (2006.01)
*H02K 3/50* (2006.01)

(56) References Cited

U.S. PATENT DOCUMENTS

| | | | |
|---|---|---|---|
| 10,992,191 B2* | 4/2021 | Nakamura | H02K 1/165 |
| 2015/0200575 A1* | 7/2015 | Tsuiki | H02K 15/04 |
| | | | 310/203 |
| 2020/0006994 A1* | 1/2020 | Koga | H02K 3/04 |
| 2020/0067364 A1* | 2/2020 | Egashira | H02K 3/14 |
| 2020/0091787 A1* | 3/2020 | Hino | H02K 3/50 |

* cited by examiner

ROTATING ELECTRIC MACHINE

CROSS REFERENCE TO RELATED APPLICATIONS

This application is a National Stage of International Application No. PCT/JP2017/019222 filed May 23, 2017.

TECHNICAL FIELD

The present invention relates to a rotating electric machine, for example, an electric motor or a power generator, and more particularly, to a structure of a stator winding.

BACKGROUND ART

In recent years, a small size and high productivity have been demanded in a rotating electric machine such as an electric motor and a power generator.

In a related-art rotating electric machine described in Patent Literature 1, terminal portions led out from a radially inner side inside slots are led out radially outward to be directly connected to terminal portions lead out from a radially outer side inside the slots to thereby form a phase winding. Wire connection of neutral points of the phase windings with use of bus bars and lead-out of output lines are performed on an axially outer side of coil ends.

In a related-art rotating electric machine described in Patent Literature 2, neutral-point bus bars and a cuff support component are coupled to each other with use of a coupling member to thereby form an integrated unit component.

CITATION LIST

Patent Literature

[PTL 1] JP 5471867 B2
[PTL 2] JP 2016-32392 A

SUMMARY OF INVENTION

Technical Problem

In Patent Literature 1, the bus bars configured to connect the neutral points of the phase windings are disposed on the axially outer side of the coil ends. Thus, there is a problem in that an axial length of the coil ends is increased to increase an axial dimension of a stator.

In Patent Literature 2, the neutral-point bus bars are arranged on a radially outer side of the coil ends. Thus, there is a problem in that a radial dimension of the coil ends is increased to increase a radial dimension of the stator.

The present invention has been made to solve the problems described above, and has an object to provide a rotating electric machine having a small size, in which increase in axial and radial dimensions is suppressed.

Solution to Problem

According to one embodiment of the present invention, there is provided a rotating electric machine including a stator, the stator including: a stator core having an annular shape, which has a plurality of slots formed in a circumferential direction of the stator core; and a stator winding mounted to the stator core. The stator winding includes a plurality of coils formed by distributed winding, each being made of a conductor that is insulation-coated. Each of the plurality of coils includes: 2X (X is a natural number equal to or larger than 1) slot insertion portions inserted into the slots; (2X-1) turn portions configured to connect the 2X slot insertion portions alternately on one axial end side and another axial end side of the stator core to continuously couple the 2X slot insertion portions; radially inner-side terminals, each extending from the slot insertion portion located at one end of the continuously coupled slot insertion portions; and radially outer-side terminals, each extending from the slot insertion portion located at another end of the continuously coupled slot insertion portions. The radially inner-side terminals extend from radially innermost positions in the slots in a one-by-one manner. The radially outer-side terminals extend from radially outermost positions in the slots in a one-by-one manner. The 2X slot insertion portions are respectively inserted into the slots so as to be arranged in one row in a radial direction of the stator core. A first terminal and a second terminal extend from two of the slots, which are separate from each other in the circumferential direction, and a third terminal extends from one of the slots, which is located between the two slots, the first terminal, the second terminal, and the third terminal each being any one of the radially inner-side terminal and the radially outer-side terminal. The first terminal and the second terminal are connected to each other with use of a bus bar. The bus bar has: a first end portion to be connected to a distal end portion of the first terminal; a second end portion to be connected to a distal end portion of the second terminal; and an interconnecting portion configured to couple the first end portion and the second end portion to each other, which is arranged in the circumferential direction on the stator core side of the first end portion and the second end portion so as to pass on the slot side of the third terminal.

Advantageous Effects of Invention

According to one embodiment of the present invention, the interconnecting portion of the bus bar is arranged in the circumferential direction on the stator core side of the first end portion to be connected to the distal end portion of the first terminal and the second end portion to be connected to the distal end portion of the second terminal so as to pass on the slot side of the third terminal. Accordingly, the interconnecting portion of the bus bar is located on the slot side of the third terminal. As a result, increase in radial dimension of coil ends is suppressed, thereby achieving downsizing of the stator in the radial direction. Further, the bus bar is not arranged so as to be located above the coil ends in an axial direction of the stator core. Thus, increase in axial dimension of the coil ends is suppressed, thereby achieving downsizing of the stator in the axial direction.

DESCRIPTION OF EMBODIMENTS

Now, with reference to the drawings, a rotating electric machine according to exemplary embodiments of the present invention is described.

First Embodiment

Figure 1:
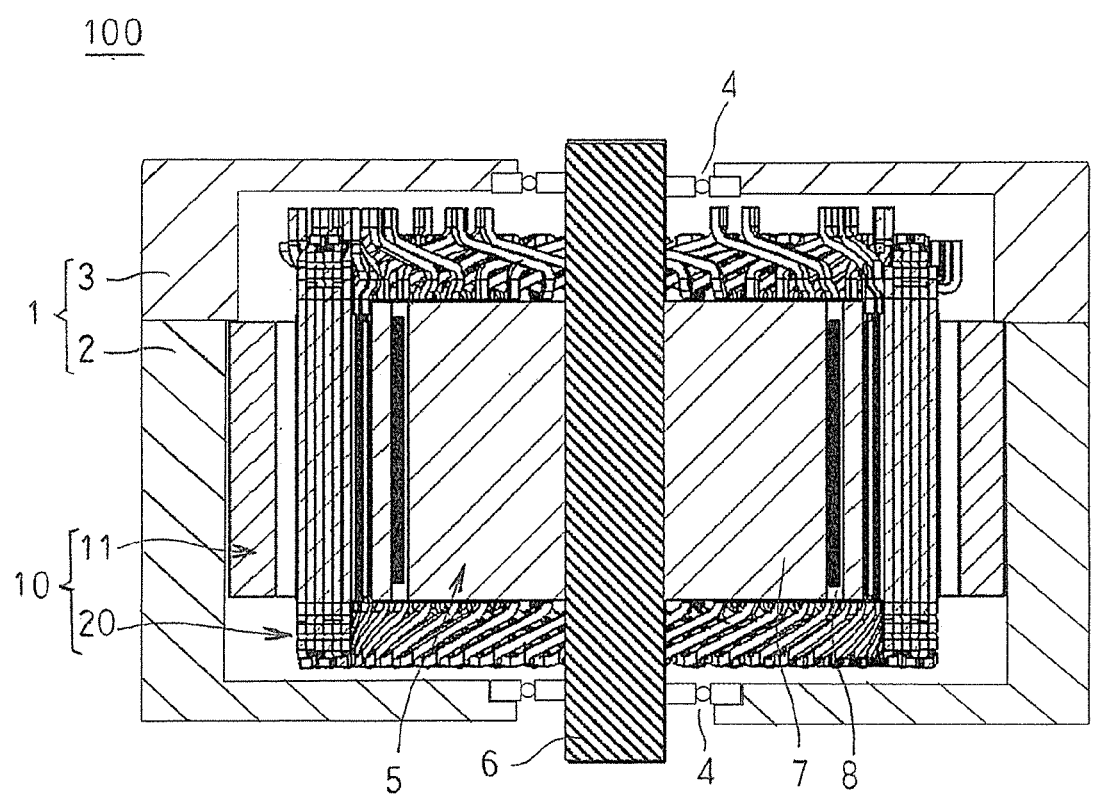
FIG. 1 is a sectional view for illustrating a rotating electric machine according to a first embodiment of the present invention.
Figure 2:
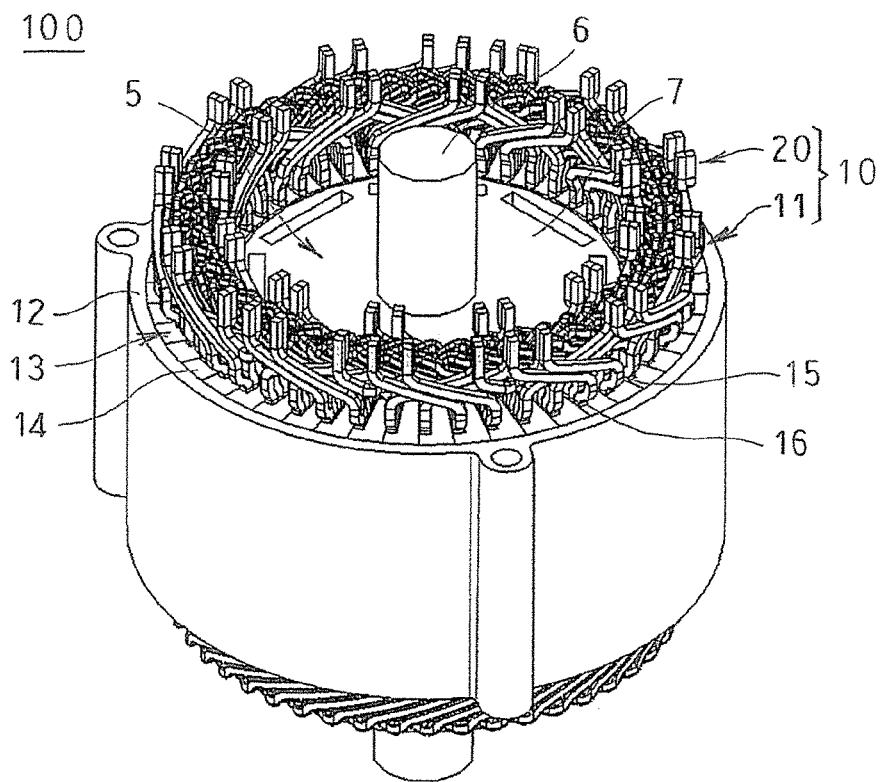
FIG. 2 is a perspective view for illustrating a main part of the rotating electric machine according to the first embodiment of the present invention.
Figure 3:
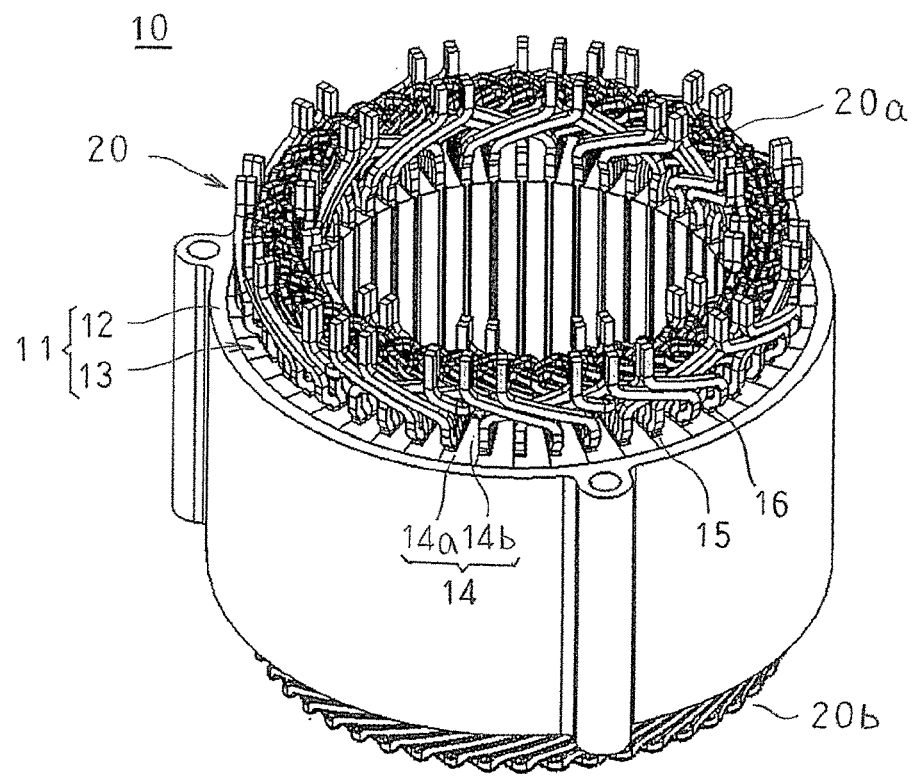
FIG. 3 is a perspective view for illustrating a stator in the rotating electric machine according to the first embodiment of the present invention.
Figure 4:
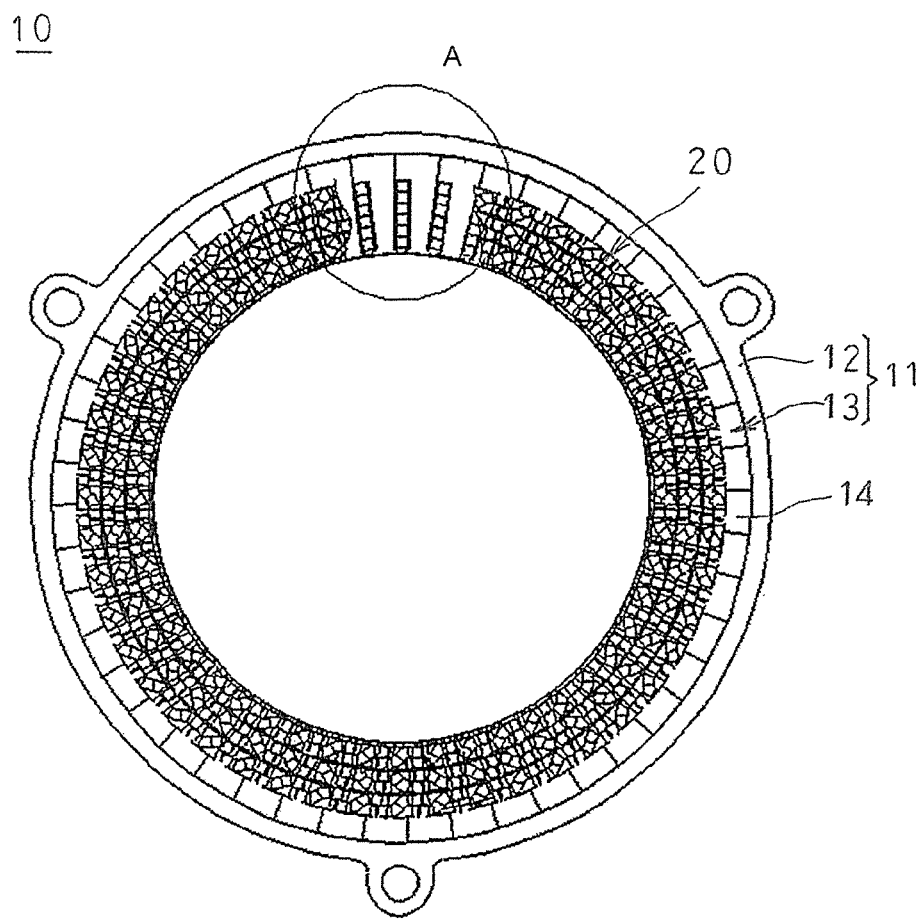
FIG. 4 is an end view for illustrating the stator in the rotating electric machine according to the first embodiment of the present invention, when viewed from an axially outer side.
Figure 5:
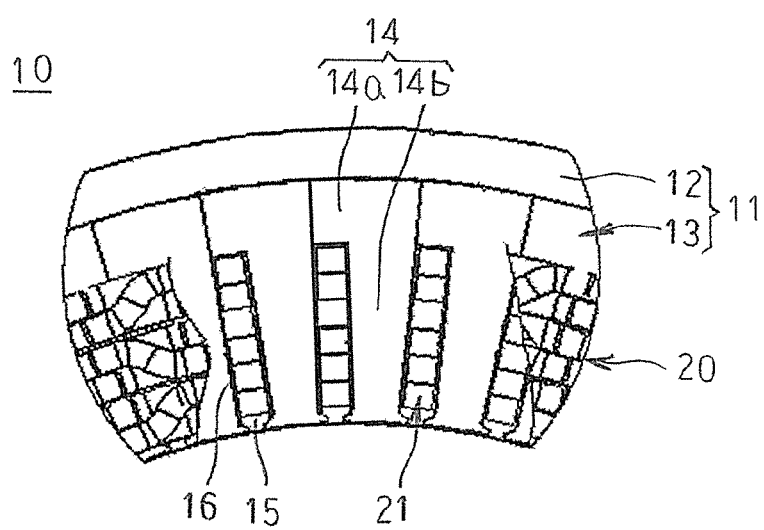
FIG. 5 is an enlarged view of a portion A of FIG. 4.
Figure 6:
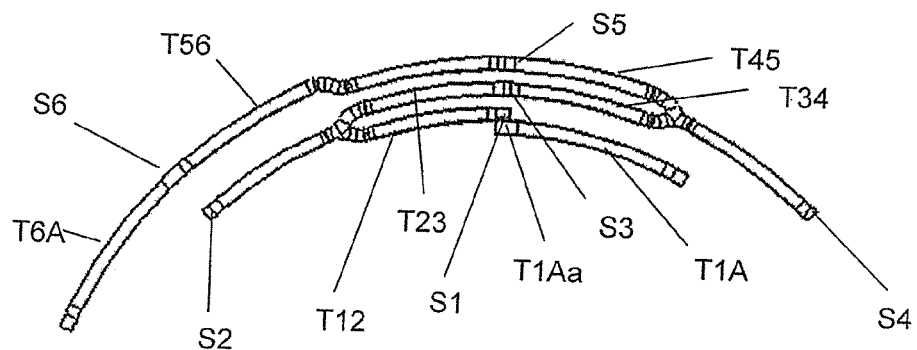
FIG. 6 is an end view of a first winding body for forming a stator winding of the stator in the rotating electric machine according to the first embodiment of the present invention when viewed from the axially outer side.
Figure 7:
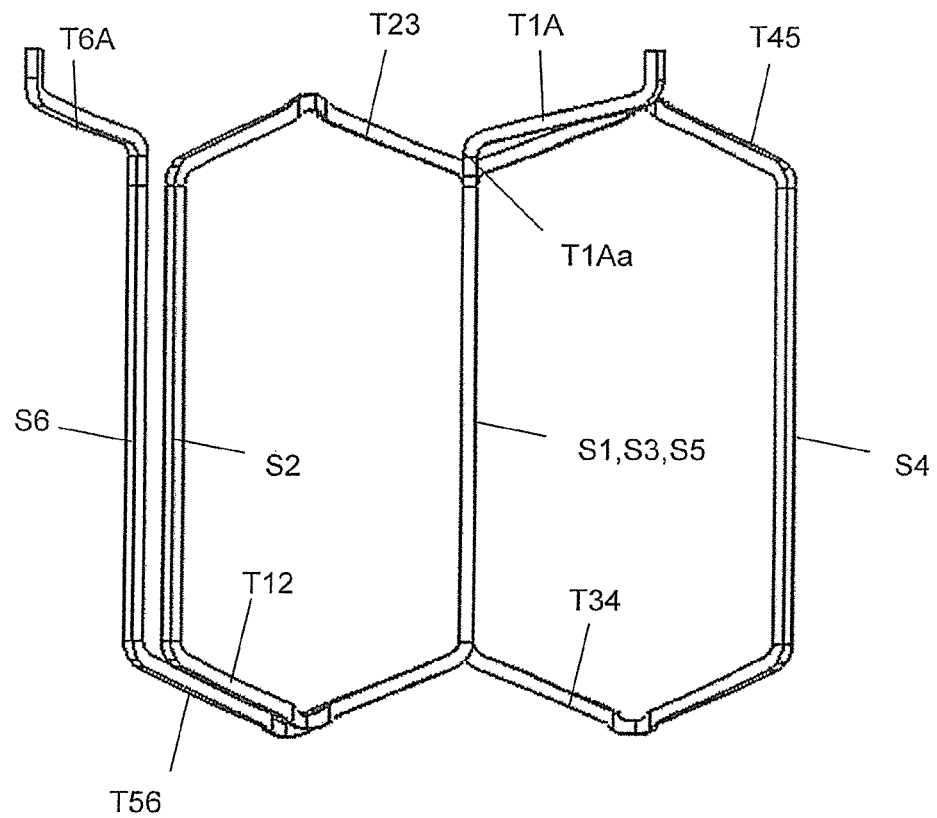
FIG. 7 is a front view of the first winding body for forming the stator winding of the stator in the rotating electric machine according to the first embodiment of the present invention when viewed from a radially inner side.
Figure 8:
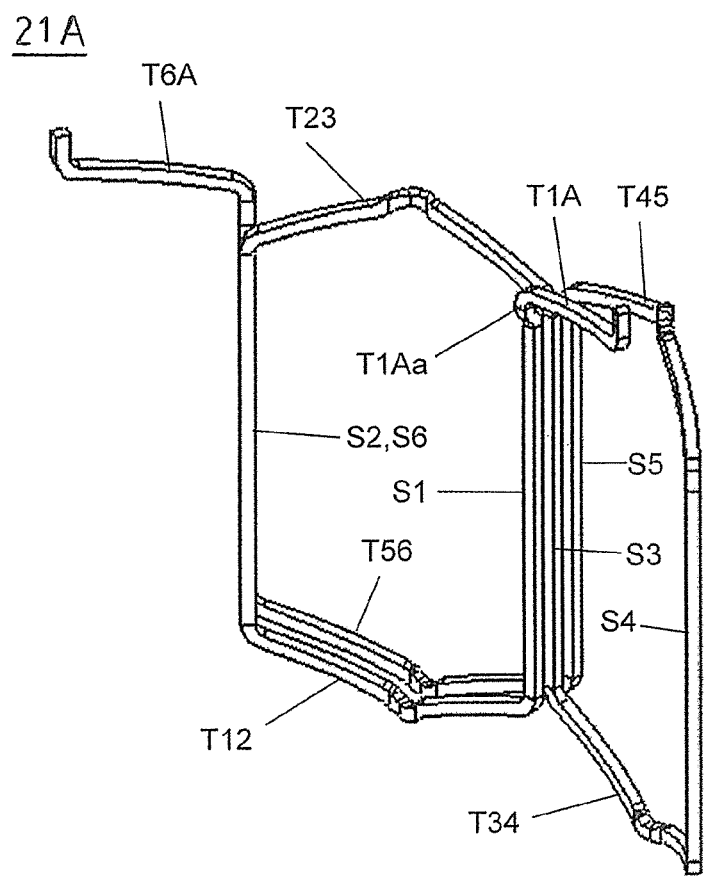
FIG. 8 is a perspective view for illustrating the first winding body for forming the stator winding of the stator in the rotating electric machine according to the first embodiment of the present invention.
Figure 9:
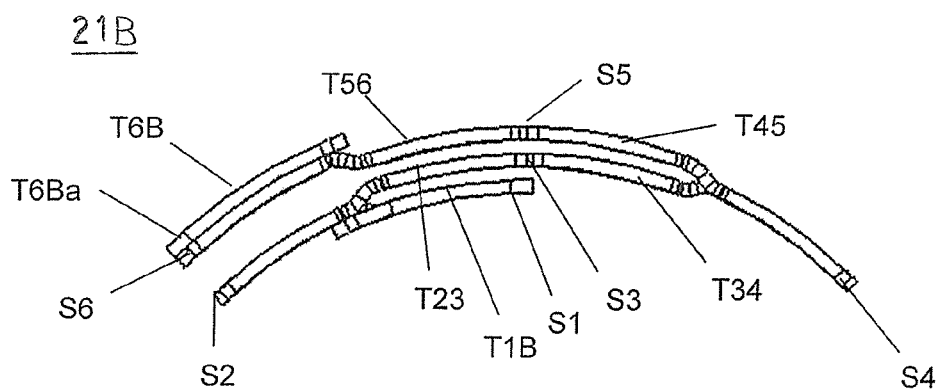
FIG. 9 is an end view of a second winding body for forming the stator winding of the stator in the rotating electric machine according to the first embodiment of the present invention when viewed from the axially outer side.
Figure 10:
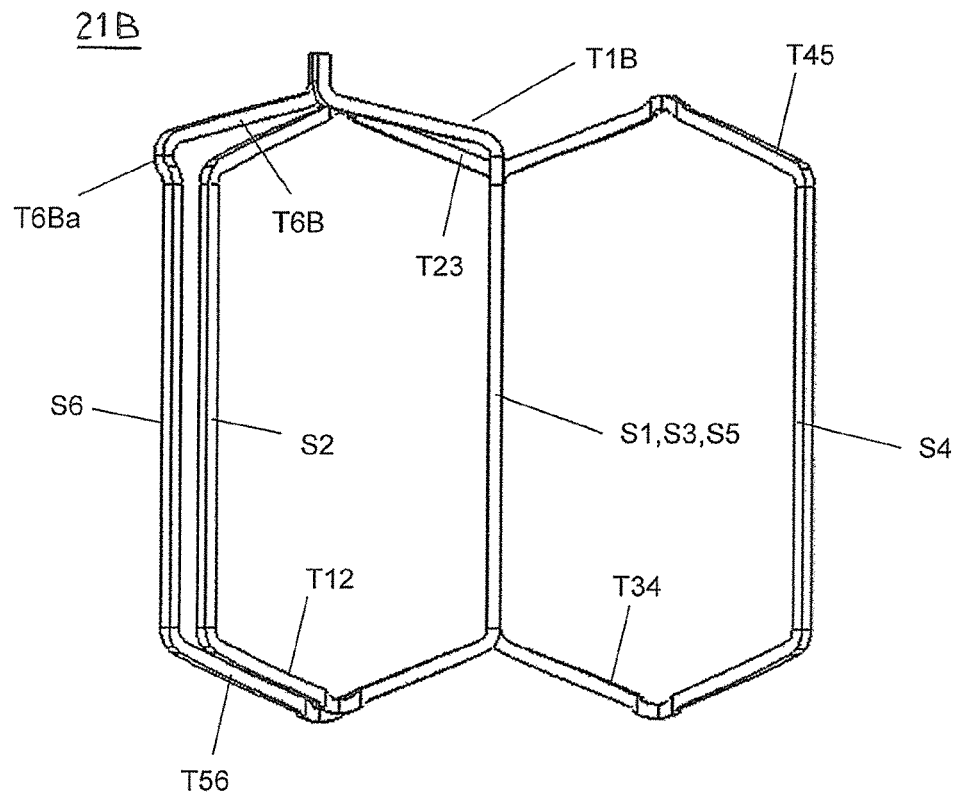
FIG. 10 is a front view of the second winding body for forming the stator winding of the stator in the rotating electric machine according to the first embodiment of the present invention when viewed from the radially inner side.
Figure 11:
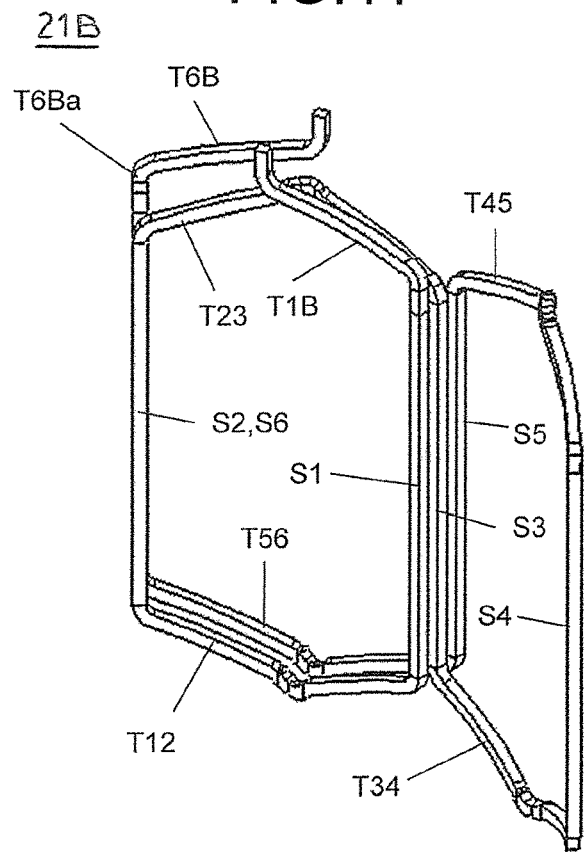
FIG. 11 is a perspective view of the second winding body for forming the stator winding of the stator in the rotating electric machine according to the first embodiment of the present invention.
Figure 12:
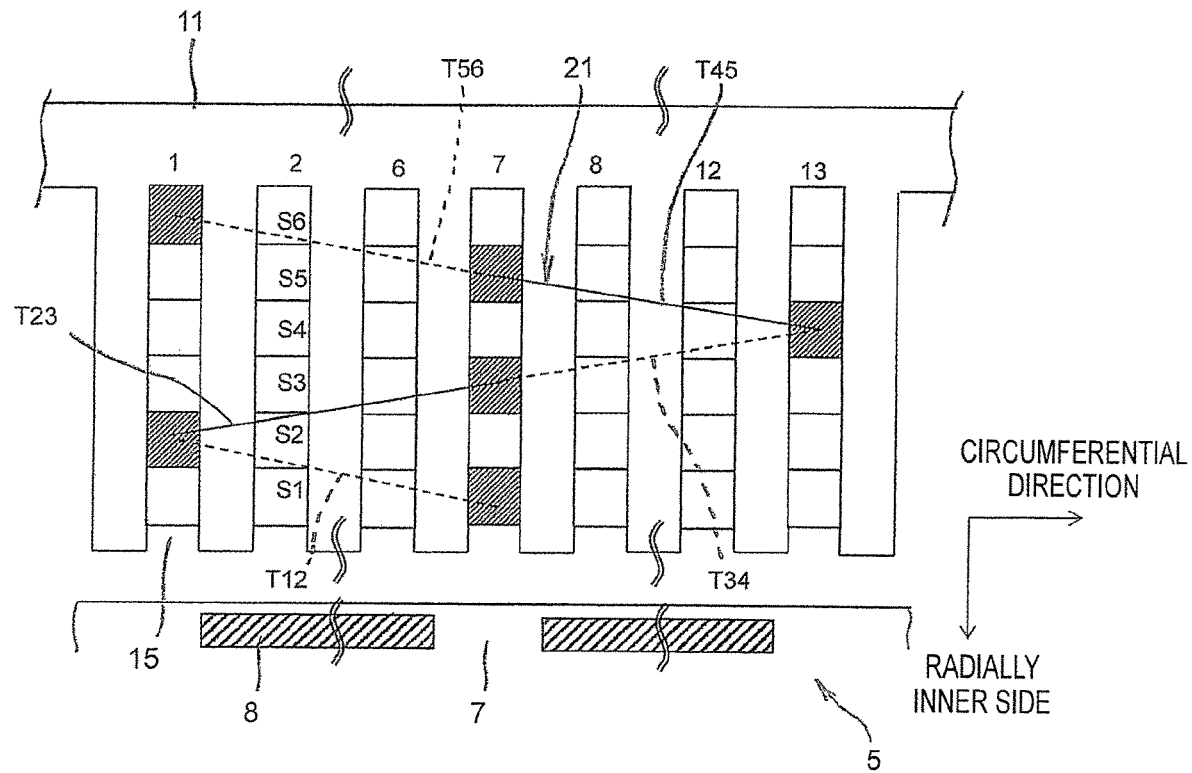
FIG. 12 is a sectional view of a main part, for schematically illustrating a slot accommodation state of a winding body in the rotating electric machine according to the first embodiment of the present invention.
Figure 13:
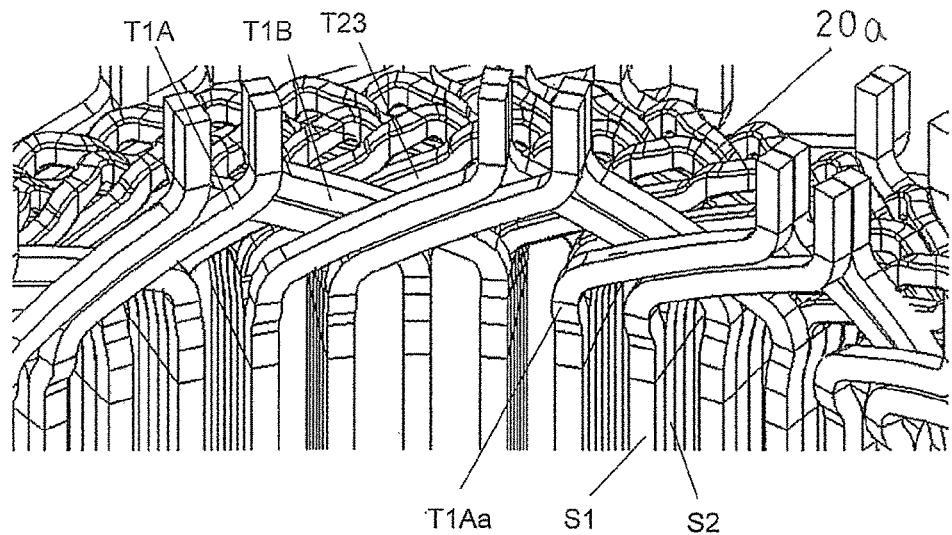
FIG. 13 is a perspective view of a main part of the stator in the rotating electric machine according to the first embodiment of the present invention, when viewed from the radially inner side.
Figure 14:
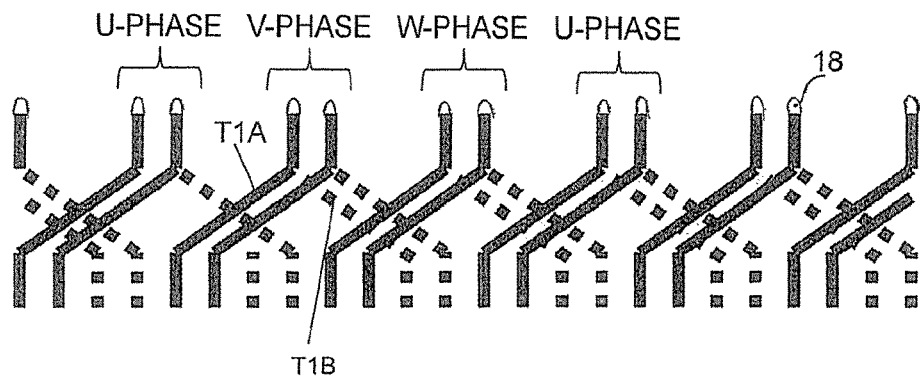
FIG. 14 is a schematic view for illustrating an arrangement state of first turn portions of the stator winding in the rotating electric machine according to the first embodiment of the present invention.
Figure 15:
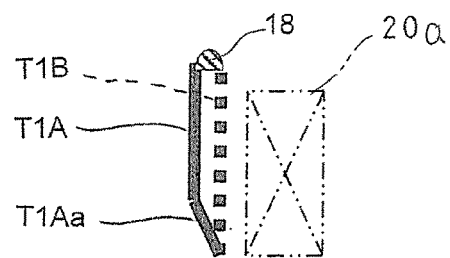
FIG. 15 is a schematic view for illustrating the arrangement state of the first turn portions of the stator winding in the rotating electric machine according to the first embodiment of the present invention.

FIG. 1 is a sectional view for illustrating a rotating electric machine according to a first embodiment of the present invention. FIG. 2 is a perspective view for illustrating a main part of the rotating electric machine according to the first embodiment of the present invention. FIG. 3 is a perspective view for illustrating a stator in the rotating electric machine according to the first embodiment of the present invention. FIG. 4 is an end view for illustrating the stator in the rotating electric machine according to the first embodiment of the present invention, when viewed from an axially outer side. FIG. 5 is an enlarged view of a portion A of FIG. 4. FIG. 6 is an end view of a first winding body for forming a stator winding of the stator in the rotating electric machine according to the first embodiment of the present invention, when viewed from the axially outer side. FIG. 7 is a front view of the first winding body for forming the stator winding of the stator in the rotating electric machine according to the first embodiment of the present invention, when viewed from a radially inner side. FIG. 8 is a perspective view for illustrating the first winding body for forming the stator winding of the stator in the rotating electric machine according to the first embodiment of the present invention. FIG. 9 is an end view of a second winding body for forming the stator winding of the stator in the rotating electric machine according to the first embodiment of the present invention, when viewed from the axially outer side. FIG. 10 is a front view of the second winding body for forming the stator winding of the stator in the rotating electric machine according to the first embodiment of the present invention, when viewed from the radially inner side. FIG. 11 is a perspective view of the second winding body for forming the stator winding of the stator in the rotating electric machine according to the first embodiment of the present invention. FIG. 12 is a sectional view of a main part, for schematically illustrating a slot accommodation state of the winding body in the rotating electric machine according to the first embodiment of the present invention. FIG. 13 is a perspective view of a main part of the stator in the rotating electric machine according to the first embodiment of the present invention, when viewed from the radially inner side. FIG. 14 and FIG. 15 are each a schematic view for illustrating an arrangement state of first turn portions of the stator winding in the rotating electric machine according to the first embodiment of the present invention. In FIG. 12, only slot insertion portions are illustrated as the winding body, and slot numbers 1, 2, . . . , 12, and 13 are slot numbers allocated to slots in the order of arrangement in a circumferential direction.

In FIG. 1 and FIG. 2, a rotating electric machine 100 includes a housing 1, a stator 10, and a rotor 5. The housing 1 includes a frame 2 and an end plate 3. The frame 2 has a bottomed cylindrical shape. The endplate 3 is configured to close an opening of the frame 2. The stator 10 is inserted into and retained in a cylindrical portion of the frame 2. The rotor 5 is firmly fixed to a rotary shaft 6 rotatably supported in a bottom of the frame 2 and the end plate 3 through intermediation of bearings 4, and is rotatably disposed on an inner peripheral side of the stator 10.

The rotor 5 is a permanent magnet rotor including a rotor core 7 and permanent magnets 8. The rotor core 7 is firmly fixed to the rotary shaft 6 inserted therethrough at an axial center position. The permanent magnets 8 are embedded in the rotor core 7 on an outer peripheral surface side of the rotor core 7 and are arranged at equal pitches in a circumferential direction of the rotor 5 to form magnetic poles. The rotor 5 is not limited to the permanent magnet rotor, and may be a squirrel-cage rotor in which an uninsulated rotor conductor is accommodated in slots of the rotor core and both sides thereof are short-circuited with use of a short-circuit ring or a winding rotor in which an insulated conductor wire is mounted to the slots of the rotor core.

Next, a configuration of the stator 10 is specifically described with reference to FIG. 2 to FIG. 10. For convenience of description, an axial direction of the rotary shaft 6 is referred to as "axial direction", a radial direction of the rotary shaft 6 is referred to as "radial direction", and a rotating direction about an axis of the rotary shaft 6 is referred to as "circumferential direction".

The stator 10 includes, as illustrated in FIG. 3, a stator core 11, a stator winding 20, and insulating members 16. The stator winding 20 is mounted to the stator core 11. The insulating members 16 are mounted to slots 15 of the stator core 11. The stator winding 20 is formed by connecting a plurality of winding bodies 21, which serve as coils, mounted to the stator core 11. Each of the insulating members 16 is formed by bending, for example, a rectangular sheet formed of a polyimide film sandwiched between meta-aramid fibers into a U shape. The insulating members 16 are inserted into the slots 15 to electrically insulate the stator core 11 and the stator winding 20 from each other.

For convenience of the description, a pole number p of the rotor 5 is set to 8, a slot number of the stator core 11 is set to 48, and the stator winding 20 is set to a three-phase winding. Specifically, the slots 15 are formed in the stator core 11 in a proportion of two slots per phase for each pole.

The stator core 11 includes, as illustrated in FIG. 3 to FIG. 5, an outer core 12 and an inner core 13. The outer core 12 has an annular shape. The inner core 13 is inserted into and retained in the outer core 12. The inner core 13 includes forty-eight core blocks 14. Each of the core blocks 14 has a core back portion 14a having an arc shape and a tooth 14b projecting radially inward from an inner peripheral wall surface of the core back portion 14a. The forty-eight core blocks 14 are inserted into and retained in the outer core 12 through, for example, press-fit or shrink-fit under a state in which circumferential side surfaces of the core back portions 14a abut against each other so that the core back portions 14a are arranged in an annular shape. The forty-eight core blocks 14 are arranged in the annular shape to form the inner core 13. A region surrounded by the core back portions 14a and the teeth 14b, which are adjacent to each other in the circumferential direction, corresponds to the slot 15.

In this case, the outer core 12 is manufactured by, for example, laminating and integrating a predetermined number of electromagnetic steel sheets, each being punched out into an annular shape. Each of the core blocks 14 is manufactured by, for example, laminating and integrating a predetermined number of electromagnetic steel sheets, each being punched out into an L-like shape.

The stator core 11 is formed by inserting and retaining the forty-eight core blocks 14 arranged in the annular shape into the outer core 12 through, for example, press-fit or shrink-fit. However, a cylindrical member made of a non-magnetic material such as aluminum may be used in place of the outer core 12.

The stator winding 20 includes the plurality of winding bodies 21. The winding bodies 21 include first winding bodies 21A and second winding bodies 21B. The first winding body 21A and the second winding body 21B have different directions in which terminals extend. In this embodiment, the first winding body 21A and the second winding body 21B are basically the same, and are distinguished from each other with additional symbols A and B. When the winding bodies are collectively referred, the reference symbol without the additional symbol A or B is used.

The first winding body 21A is formed in a shape of "8" in the following manner. A conductor wire 19 having a rectangular cross section is formed of, for example, a copper wire or an aluminum wire, which is insulation-coated with an enamel resin and is continuous without a connecting portion. The conductor wire 19 is inserted into a first slot, a second slot, and a third slot, which are arranged in the circumferential direction so as to be separate from each other by a six-slot distance. The conductor wire 19 is inserted into the second slot, the first slot, the second slot, the third slot, the second slot, and the first slot in the stated order while alternately changing an axial insertion direction into the first slot, the second slot, and the third slot so that a radial insertion position inside the slot 15 is sequentially displaced radially outward by one layer. The thus formed first winding body 21A is a winding formed by distributed winding and lap winding. A conductor wire having a circular cross section may be used in place of the conductor wire 19 having the rectangular cross section. The six-slot distance is a distance between the slots 15 positioned on both sides of six teeth 14, which are continuous in the circumferential direction, and corresponds to one magnetic-pole pitch.

The first winding body 21A includes, as illustrated in FIG. 6 to FIG. 8, a first slot insertion portion S1, a second slot insertion portion S2, a third slot insertion portion S3, a fourth slot insertion portion S4, a fifth slot insertion portion S5, a sixth slot insertion portion S6, a first turn portion T1A, a second turn portion T12, a third turn portion T23, a fourth turn portion T34, a fifth turn portion T45, a sixth turn portion T56, and a seventh turn portion T6A. The first slot insertion portion S1, the second slot insertion portion S2, the third slot insertion portion S3, the fourth slot insertion portion S4, the fifth slot insertion portion S5, and the sixth slot insertion portion S6 are arranged in three rows so that the rows are separate from each other by the six-slot distance. The first turn portion T1A extends from one end of the first slot insertion portion S1. The second turn portion T12 couples another end of the first slot insertion portion S1 and another end of the second slot insertion portion S2 to each other. The third turn portion T23 couples one end of the second slot insertion portion S2 and one end of the third slot insertion portion S3 to each other. The fourth turn portion T34 couples another end of the third slot insertion portion S3 and another end of the fourth slot insertion portion S4 to each other. The fifth turn portion T45 couples one end of the fourth slot insertion portion S4 and one end of the fifth slot insertion portion S5 to each other. The sixth turn portion T56 couples another end of the fifth slot insertion portion S5 and another end of the sixth slot insertion portion S6 to each other. The seventh turn portion T6A extends from one end of the sixth slot insertion portion S1. In this case, the first turn portion T1A corresponds to a radially inner-side terminal, and the seventh turn portion T6A corresponds to a radially outer-side terminal.

The first slot insertion portion S1 and the second slot insertion portion S2 are radially displaced from each other by a radial thickness of the conductor wire 19 through a crank portion formed at a circumferential intermediate position in the second turn portion T12. The second slot insertion portion S2 and the third slot insertion portion S3 are radially displaced from each other by the radial thickness of the conductor wire 19 through a crank portion formed at a circumferential intermediate position in the third turn portion T23. The third slot insertion portion S3 and the fourth slot insertion portion S4 are radially displaced from each other by the radial thickness of the conductor wire 19 through a crank portion formed at a circumferential intermediate position in the fourth turn portion T34. The fourth slot insertion portion S4 and the fifth slot insertion portion S5 are radially displaced from each other by the radial thickness of the conductor wire 19 through a crank portion formed at a circumferential intermediate position in the fifth turn portion T45. The fifth slot insertion portion S5 and the sixth slot insertion portion S6 are radially displaced from each other by the radial thickness of the conductor wire 19 through a crank portion formed at a circumferential intermediate position in the sixth turn portion T56.

The second turn portion T12 extends from the another end of the first slot insertion portion S1 to reach a radially inner-side end portion of the crank portion while maintaining a radial position and extends from a radially outer-side end portion of the crank portion to reach the another end of the second slot insertion portion S2 while maintaining a radial position. Specifically, the second turn portion T12 has the crank portion corresponding to a vertex and a pair of oblique-side portions located on both side of the crank portion in the circumferential direction. The third turn portion T23, the fourth turn portion T34, . . . , and the sixth turn portion T56 have the same configuration as the second turn portion T12.

The first turn portion T1A is displaced radially inward by the radial thickness of the conductor wire 19 at a crank portion T1Aa after extending from the one end of the first slot insertion portion S1, then extends in parallel to an oblique-side portion of the fifth turn portion T45, which is connected to the one end of the fifth slot insertion portion S5, while maintaining a radial position, and then is bent to extend axially outward. A radially inward displacement amount through the crank portion T1Aa may be set larger than the radial thickness of the conductor wire 19.

The seventh turn portion T6A extends from one end of the sixth slot insertion portion S6 in parallel to an oblique-side portion of the third turn portion T23, which is connected to the one end of the third slot insertion portion S3, while maintaining a radial position, and then is bent to extend axially outward.

The second winding body 21B is formed in a shape of "8" in the following manner. As illustrated in FIG. 9 to FIG. 11, similarly to the first winding body 21A, the conductor wire 19 is inserted into a first slot, a second slot, and a third slot, which are arranged in the circumferential direction so as to be separate from each other by a six-slot distance. The conductor wire 19 is inserted into the second slot, the first slot, the second slot, the third slot, the second slot, and the first slot in the stated order while alternately changing an axial insertion direction into the first slot, the second slot, and the third slot so that a radial insertion position inside the slot 15 is sequentially displaced radially outward by one layer.

More specifically, the second winding body 21B includes the first slot insertion portion S1, the second slot insertion portion S2, the third slot insertion portion S3, the fourth slot insertion portion S4, the fifth slot insertion portion S5, the sixth slot insertion portion S6, a first turn portion T1B, the second turn portion T12, the third turn portion T23, the fourth turn portion T34, the fifth turn portion T45, the sixth turn portion T56, and a seventh turn portion T6B. The first turn portion T1B corresponds to the radially inner-side terminal, and the seventh turn portion T6B corresponds to the radially outer-side terminal.

The first turn portion T1B extends from one end of the first slot insertion portion S1 in parallel to an oblique-side portion of the third turn portion T23, which is connected to the one end of the third slot insertion portion S3, while maintaining a radial position, and then is bent to extend axially outward.

The seventh turn portion T6B is displaced radially outward by the radial thickness of the conductor wire 19 at a crank portion T6Ba after extending from the one end of the sixth slot insertion portion S6, then extends in parallel to an oblique-side portion of the third turn portion T23, which is connected to the one end of the second slot insertion portion S2, while maintaining a radial position, and then is bent to extend axially outward. A radially inward displacement amount through the crank portion T6Ba may be set larger than the radial thickness of the conductor wire 19.

As described above, the second winding body 21B is formed similarly to the first winding body 21A except for the first turn portion T1B and the seventh turn portion T6B.

As for the winding body 21, as illustrated in FIG. 12, the first slot insertion portion S1 is inserted at a position of a first layer in the slot 15 having the slot number 7, the second slot insertion portion S2 is inserted at a position of a second layer in the slot 15 having the slot number 1, the third slot insertion portion S3 is inserted at a position of a third layer in the slot 15 having the slot number 7, the fourth slot insertion portion S4 is inserted at a position of a fourth layer in the slot 15 having the slot number 13, the fifth slot insertion portion S5 is inserted at a position of a fifth layer in the slot 15 having the slot number 7, and the sixth slot insertion portion S6 is inserted at a position of a sixth layer in the slot 15 having the slot number 1.

As described above, the same number of winding bodies 21 as the number of slots 15 are mounted to the stator core 11 at one-slot pitches in the circumferential direction. In each of the slots 15, the first slot insertion portion S1, the second slot insertion portion S2, the third slot insertion portion S3, the fourth slot insertion portion S4, the fifth slot insertion portion S5, and the sixth slot insertion portion 6, which are part of three windings 21, are inserted into six layers so as to be arranged in one row in the radial direction. The first layer is a radially innermost layer among the six layers corresponding to the first to sixth slot insertion portions S1 to S6, and the sixth layer is a radially outermost layer.

More specifically, the first winding bodies 21A and the second winding bodies 21B are mounted to the stator core 11 at the one-slot pitches so that sets, each including two first winding bodies 21A, and sets, each including two second winding bodies 21B, are alternately arranged in the circumferential direction. With the arrangement described above, on one axial end side of the stator core 11, a layer of the third turn portions T23, in which the third turn portions T23 arranged in the circumferential direction at the one-slot pitches are located, and a layer of the third turn portions T45, in which the fifth turn portions T45 arranged in the circumferential direction at the one-slot pitches are located, are arranged in two layers in the radial direction to form a first coil end 20a. The first turn portions T1A and the first turn portions T1B are arranged in the circumferential direction on a radially inner side of the first coil ends 20a so that a direction of inclination of the oblique-side portions of a set of two first turn portions T1A and a direction of inclination of the oblique-side portions of a set of two first turn portions T1B, which extend from the first layers in the slots 15, are set alternately opposite. Similarly, the seventh turn portions T6A and the seventh turn portions T6B are arranged in the circumferential direction on a radially outer side of the first coil ends 20a so that a direction of inclination of the oblique-side portions of a set of the seventh turn portions T6A and a direction of inclination of the oblique-side portions of a set of the seventh turn portions T6B, which extend from the sixth layers of the slots 15, are set alternately opposite to each other. Further, on another axial end side of the stator core 11, a layer of the second turn portions T12, in which the second turn portions T12 are arranged at the one-slot pitches in the circumferential direction, a layer of the fourth turn portions T34, in which the fourth turn portions T34 are arranged at the one-slot pitches in the circumferential direction, and a layer of the sixth turn portions T56, in which the sixth turn portions T56 are arranged at the one-slot pitches in the circumferential direction, are arranged as three layers in the radial direction to form a second coil end 20b.

In the stator 10, as illustrated in FIG. 13 and FIG. 14, an end portion of the first turn portion T1A of the first winding body 21A extending from the slot 15 and an end portion of the first turn portion T1B of the second winding body 21B extending from the slot 15 being separate from each other by one magnetic-pole pitch, specifically, six slots, are arranged so as to be held in contact with each other in the radial direction. The end portion of the first turn portion T1A and the end portion of the first turn portion T1B, which are held in contact with each other in the radial direction, are joined to each other through a joint portion 18. Two joint portions 18, each for joining the end portion of the first turn portion T1A and the end portion of the first turn portion T1B, which are held in contact with each other in the radial direction, are arranged so as to be separate from each other by a one-slot distance. Sets, each including the two joint portions 18, are arranged in the circumferential direction so as to be separate from each other by a four-slot distance. As illustrated in FIG. 15, the oblique-side portion of the first turn portion T1A is displaced radially inward through the crank portion T1Aa formed at a bottom by the radial thickness of the conductor wire 19 to thereby avoid interference with the first turn portion T1B.

Further, an end portion of the seventh turn portion T6A of the first winding body 21A extending from the slot 15 and an end portion of the seventh turn portion T6B of the second winding body 21B extending from the slot 15 being separate from each other by six slots are arranged so as to be held in contact with each other in the radial direction. The end portion of the seventh turn portion T6A and the end portion of the seventh turn portion T6B, which are held in contact with each other in the radial direction, are joined to each other through a joint portion 18. Two joint portions 18, each for joining the end portion of the seventh turn portion T6A and the end portion of the seventh turn portion T6B, which are held in contact with each other in the radial direction, are arranged so as to be separate from each other by a one-slot distance. Sets, each including the two joint portions 18, are arranged in the circumferential direction so as to be separate from each other by a four-slot distance. The oblique-side portion of the seventh turn portion T6B is displaced radially outward through the crank portion T6Aa formed at a bottom by the radial thickness of the conductor wire 19 to thereby avoid interference with the seventh turn portion T6B.

The set of two joint portions 18, each for joining the first turn portions T1A and T1B, which are arranged to be separate from each other by the one-slot distance, has the same phase, as illustrated in FIG. 14.

As described above, each of phase windings of the stator winding 20 is formed by joining the first turn portion T1A of the first winding body 21A and the first turn portion T1B of the second winding body 21B, which form the phase winding, to each other through, for example, welding and joining the seventh turn portion T6A of the first winding body 21A and the seventh turn portion T6B of the second winding body 21B to each other through, for example, welding.

Figure 16:
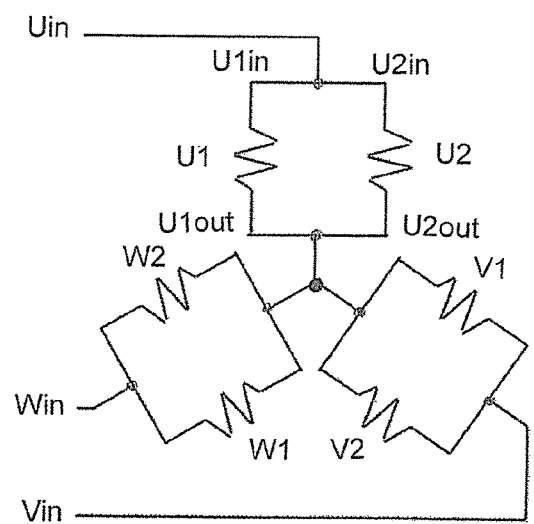
FIG. 16 is a diagram for illustrating a wire-connection pattern of the stator winding in the rotating electric machine according to the first embodiment of the present invention.

Next, a specific wire-connection pattern of the stator winding 20 is described. FIG. 16 is a diagram for illustrating a wire-connection pattern of the stator winding in the rotating electric machine according to the first embodiment of the present invention.

As illustrated in FIG. 16, the stator winding 20 is formed by wire connection of a U-phase coil, a V-phase coil, and a W-phase coil in a Y-connection configuration. The U-phase coil is formed by connecting a U1-phase coil and a U2-phase coil in parallel. The V-phase coil is formed by connecting a V1-phase coil and a V2-phase coil in parallel. The W-phase coil is formed by connecting a W1-phase coil and a W2-phase coil in parallel. Portions Uin, Vin, and Win correspond to power feeding portions.

Figure 17:
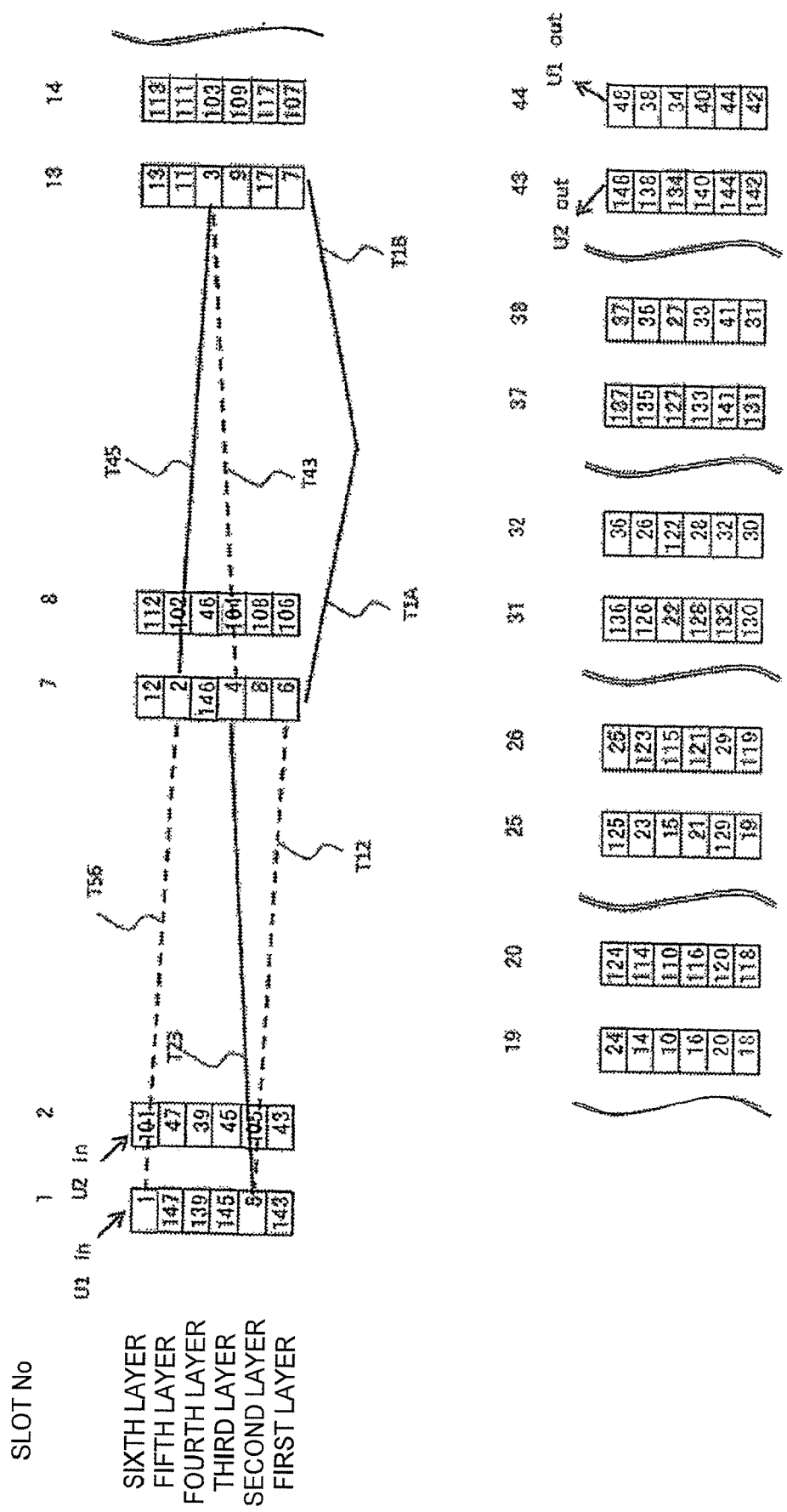
FIG. 17 is a diagram for illustrating a wire-connection pattern of a U-phase coil in the rotating electric machine according to the first embodiment of the present invention.
Figure 18:
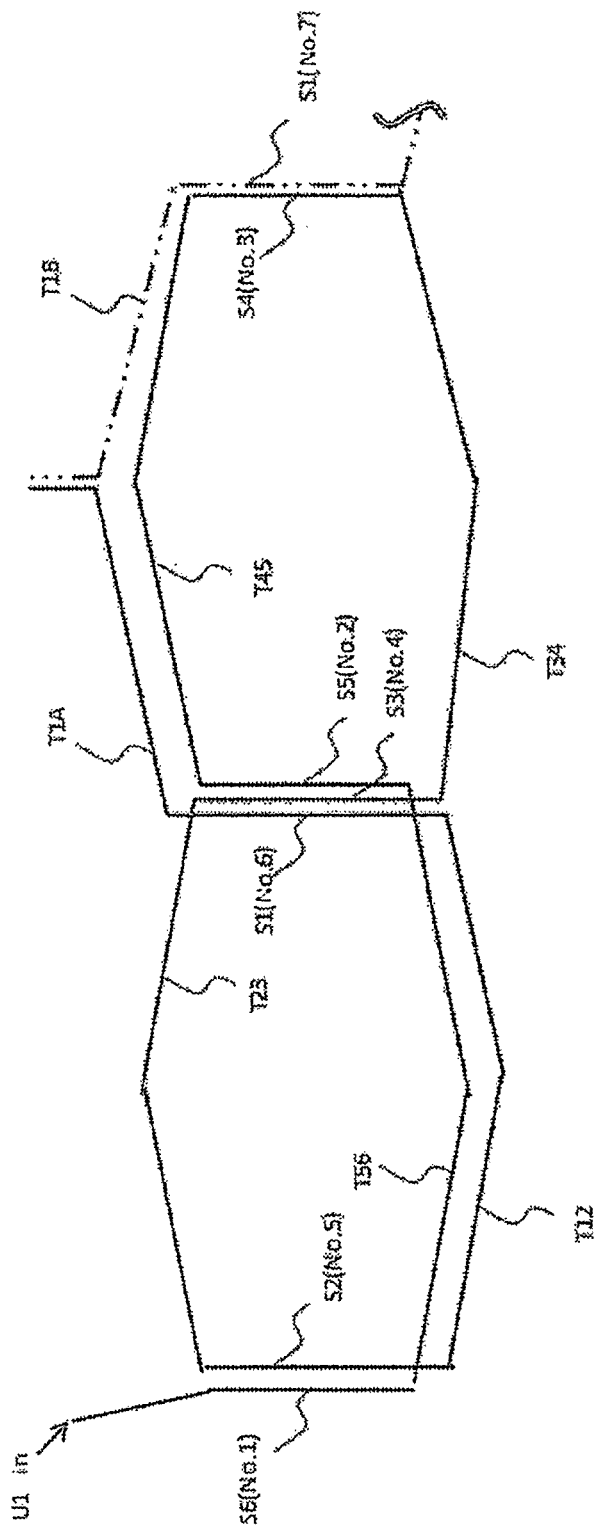
FIG. 18 is a schematic view of the winding bodies of the U-phase coil when viewed from the radially inner side.

Next, a specific wire-connection pattern from the power feeding portion Uin to a neutral point in the U-phase coil is described. FIG. 17 is a diagram for illustrating a wire-connection pattern of the U-phase coil in the rotating electric machine according to the first embodiment of the present invention, and FIG. 18 is a schematic view of the winding bodies of the U-phase coil when viewed from the radially inner side. In FIG. 17, slot numbers 1 to 48 are allocated to the slots of the stator core in the order of arrangement in the circumferential direction. The slots are arranged in the annular shape at pitches of 7.5 degrees. In FIG. 17, however, the slots are illustrated in a linearly developed manner for convenience. In FIG. 17, a vertical direction on the drawing sheet is the radial direction, a horizontal direction on the drawing sheet is the circumferential direction, and a direction perpendicular to the drawing sheet is the axial direction. In FIG. 17, the slot insertion portions of the winding bodies are represented by rectangles. Six slot insertion portions are arranged in one row in the radial direction inside each of the slots. Numbers allocated to the slot insertion portions indicate the order of connection from a power feeding side to the neutral point. Layers of the slot insertion portions inserted into each of the slots are denoted as a first layer, a second layer, ..., and a sixth layer from the radially inner side. The same denotation is used in FIG. 19 and FIG. 21. In FIG. 18, numbers allocated to the slot insertion portions indicate the order of connection from the power feeding side to the neutral point. The same indication is used in FIG. 20 and FIG. 22.

The U1-phase coil is formed by wire connection of the first winding bodies 21A and the second winding bodies 21B, which are inserted into a slot group of the slots having the slot numbers {1+6(m-1)} and the slot numbers {2+6(m-1)}, in which m is an integer equal to or larger than 1 and equal to or smaller than 8.

First, the sixth slot insertion portion S6 located in the sixth layer in the slot having the slot number 1 is connected to the fifth slot insertion portion S5 located in the fifth layer in the slot having the slot number 7 through the sixth turn portion T56. The fifth slot insertion portion S5 is connected to the fourth slot insertion portion S4 located in the fourth layer in the slot having the slot number 13 through the fifth turn portion T45. The fourth slot insertion portion S4 is connected to the third slot insertion portion S3 located in the third layer in the slot having the slot number 7 through the fourth turn portion T34. The third slot insertion portion S3 is connected to the second slot insertion portion S2 located in the second layer in the slot having the slot number 1 through the third turn portion T23. The second slot insertion portion S2 is connected to the first slot insertion portion S1 located in the first layer in the slot having the slot number 7 through the second turn portion T12. The first slot insertion portion S1 is connected to the first slot insertion portion S1 located in the first layer in the slot having the slot number 13 through the first turn portions T1A and T1B.

The above-mentioned operation is repeated to connect the slot insertion portions having the slot numbers from 1 to 24.

As a result, the sets, each including two first winding bodies 21A, and the sets, each including two second winding bodies 21B, which are inserted into the slot group of the slots having the slot numbers {1+6(m-1)}, are alternately connected in series.

Next, the sixth slot insertion portion S6 located in the sixth layer in the slot having the slot number 19 is connected to the sixth slot insertion portion S6 located in the sixth layer in the slot having the slot number 26 being separate from the slot having the slot number 19 by seven slots through the seventh turn portions T6A and T6B. The sixth slot insertion portion S6 is connected to the fifth slot insertion portion S5 located in the fifth layer in the slot having the slot number 32 through the sixth turn portion T56. The fifth slot insertion portion S5 is connected to the fourth slot insertion portion S4 located in the fourth layer in the slot having the slot number 38 through the fifth turn portion T45. The fourth slot insertion portion S4 is connected to the third slot insertion portion S3 located in the third layer in the slot having the slot number 32 through the fourth turn portion T34. The third slot insertion portion S3 is connected to the second slot insertion portion S2 located in the second layer in the slot having the slot number 26 through the third turn portion T23. The second slot insertion portion S2 is connected to the first slot insertion portion S1 located in the first layer in the slot having the slot number 32 through the second turn portion T12. The first slot insertion portion S1 is connected to the first slot insertion portion S1 located in the first layer in the slot having the slot number 38 through the first turn portions T1A and T1B.

The above-mentioned operation is repeated to connect the slot insertion portions having the slot numbers from 25 to 48. As a result, the sets, each including two first winding bodies 21A, and the sets, each including two second winding bodies 21B, which are inserted into the slot group of the slots having the slot numbers {2+6(m-1)}, are alternately connected in series.

In the manner described above, the U1-phase coil is formed by connecting the four winding bodies 21 inserted into the slot group of the slots having the slot numbers {1+6(m-1)} and the four winding bodies 21 inserted into the slot group of the slots having the slot numbers {2+6(m-1)} in series. The seventh turn portion T6B extending from the sixth slot insertion portion S6 located in the sixth layer in the slot having the slot number 1 serves as the power feeding portion U1in of the U1-phase coil, and the seventh turn portion T6B extending from the sixth slot insertion portion S6 located in the sixth layer in the slot having the slot number 44 serves as a neutral point U1out.

Next, the U2-phase coil is formed by wire connection of the first winding bodies 21A and the second winding bodies 21B inserted into the slot group of the slots having the slot numbers {1+6(m-1)} and the slot group of the slots having the slot numbers {2+6(m-1)}.

First, the sixth slot insertion portion S6 located in the sixth layer in the slot having the slot number 2 is connected to the fifth slot insertion portion S5 located in the fifth layer in the slot having the slot number 8 through the sixth turn portion T56. The fifth slot insertion portion S5 is connected to the fourth slot insertion portion S4 located in the fourth layer in the slot having the slot number 14 through the fifth turn portion T45. The fourth slot insertion portion S4 is connected to the third slot insertion portion S3 located in the third layer in the slot having the slot number 8 through the fourth turn portion T34. The third slot insertion portion S3 is connected to the second slot insertion portion S2 located in the second layer in the slot having the slot number 2 through the third turn portion T23. The second slot insertion portion S2 is connected to the first slot insertion portion S1 located in the first layer in the slot having the slot number 8 through the second turn portion T12. The first slot insertion portion S1 is connected to the first slot insertion portion S1 located in the first layer in the slot having the slot number 14 through the first turn portions T1A and T1B.

The above-mentioned operation is repeated to connect the slot insertion portions having the slot numbers from 101 to 124. As a result, the sets, each including two first winding bodies 21A, and the sets, each including two second winding bodies 21B, which are inserted into the slot group of the slots having the slot numbers {2+6(m-1)}, are alternately connected in series.

Next, the sixth slot insertion portion S6 located in the sixth layer in the slot having the slot number 20 is connected to the sixth slot insertion portion S6 located in the sixth layer in the slot having the slot number 25 being separate from the slot having the slot number 20 by five slots through the seventh turn portions T6A and T6B. The sixth slot insertion portion S6 is connected to the fifth slot insertion portion S5 located in the fifth layer in the slot having the slot number 31 through the sixth turn portion T56. The fifth slot insertion portion S5 is connected to the fourth slot insertion portion S4 located in the fourth layer in the slot having the slot number 37 through the fifth turn portion T45. The fourth slot insertion portion S4 is connected to the third slot insertion portion S3 located in the third layer in the slot having the slot number 31 through the fourth turn portion T34. The third slot insertion portion S3 is connected to the second slot insertion portion S2 located in the second layer in the slot having the slot number 25 through the third turn portion T23. The second slot insertion portion S2 is connected to the first slot insertion portion S1 located in the first layer in the slot having the slot number 31 through the second turn portion T12. The first slot insertion portion S1 is connected to the first slot insertion portion S1 located in the first layer in the slot having the slot number 37 through the first turn portions T1A and T1B.

The above-mentioned operation is repeated to connect the slot insertion portions having the slot numbers from 125 to 148. As a result, the sets, each including two first winding bodies 21A, and the sets, each including two second winding bodies 21B, which are inserted into the slot group of the slots having the slot numbers {1+6(m-1)}, are alternately connected in series.

In the manner described above, the U2-phase coil is formed by connecting the four winding bodies 21, that is, the first winding bodies 21A and the second winding bodies 21B inserted into the slot group of the slots having the slot numbers {1+6(m-1)} and the four winding bodies 21, that is, the first winding bodies 21A and the second winding bodies 21B inserted into the slot group of the slots having the slot numbers {2+6(m-1)} in series. The seventh turn portion T6B extending from the sixth slot insertion portion S6 located in the sixth layer in the slot having the slot number 2 serves as the power feeding portion U1in of the U2-phase coil, and the seventh turn portion T6B extending from the sixth slot insertion portion S6 located in the sixth layer in the slot having the slot number 43 serves as a neutral point U2out.

As described above, each of the U1-phase coil and the U2-phase coil is formed by serially connecting the four winding bodies 21 inserted into the slot group of the slots having the slot numbers {1+6(m-1)} and the four winding bodies 21 inserted into the slot group of the slots having the slot numbers {2+6(m-1)}. Specifically, the U1-phase coil and the U2-phase coil have the same configuration. The U-phase coil is formed by connecting the U1-phase coil and the U2-phase coil in parallel.

Figure 19:
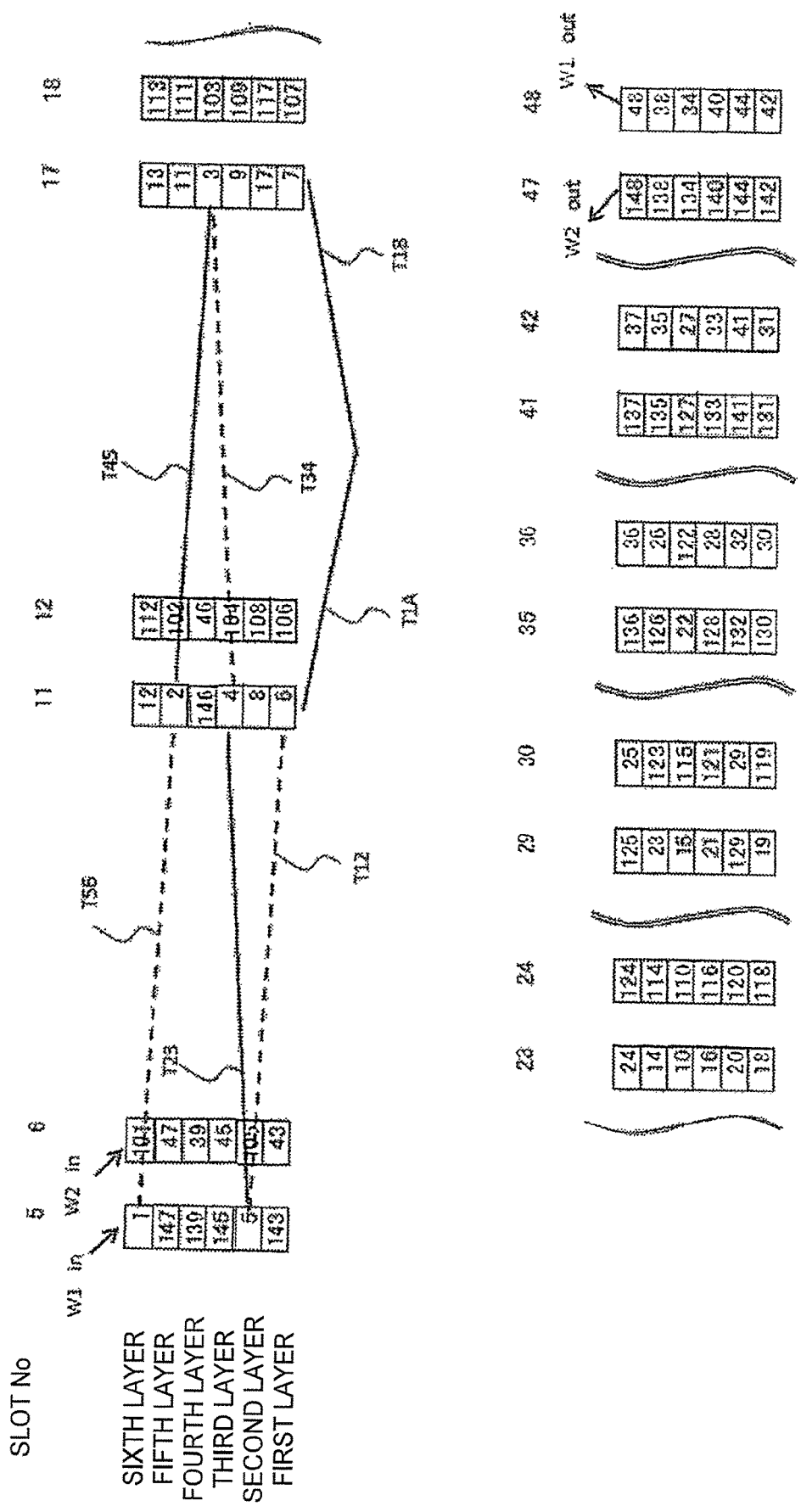
FIG. 19 is a diagram for illustrating a wire-connection pattern of a W-phase coil in the rotating electric machine according to the first embodiment of the present invention.
Figure 20:
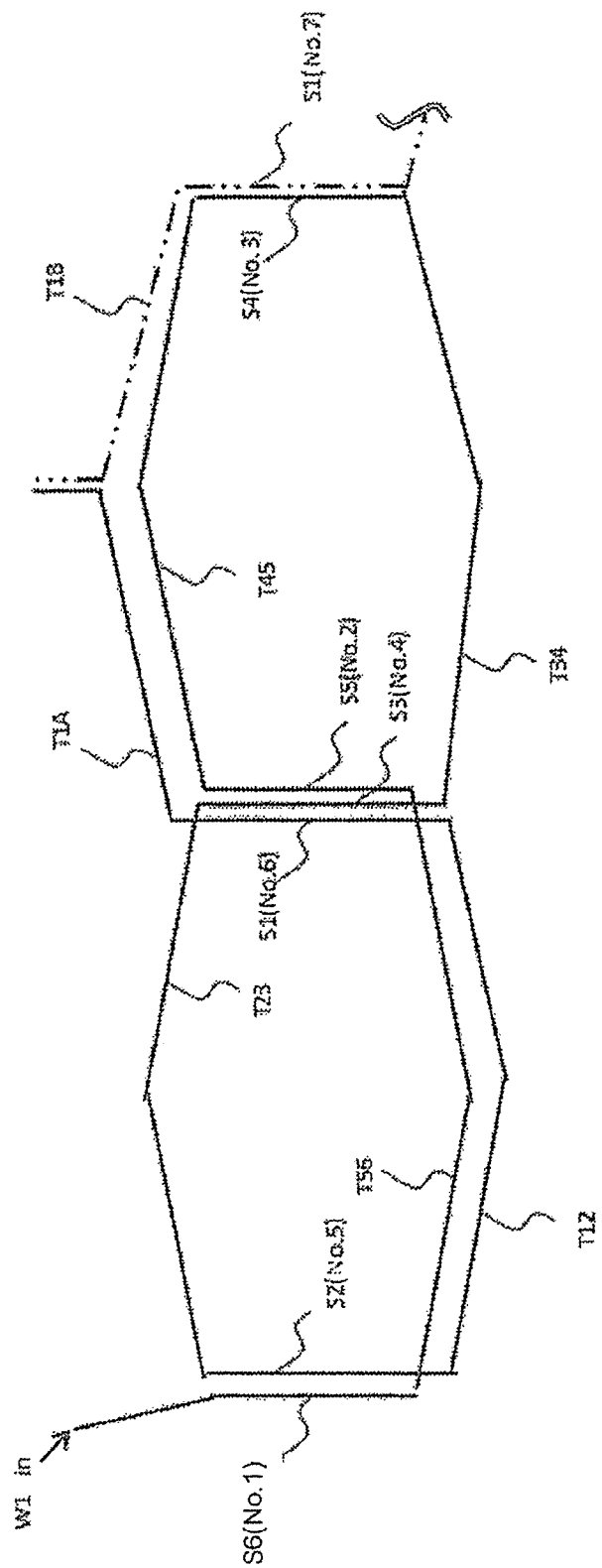
FIG. 20 is a schematic view of the winding bodies of the W-phase coil, when viewed from the radially inner side.

Next, a specific wire-connection pattern from the power feeding portion Win to a neutral point in the W-phase coil is described. FIG. 19 is a diagram for illustrating a wire-connection pattern of the W-phase coil in the rotating electric machine according to the first embodiment of the present invention, and FIG. 20 is a schematic view of the winding bodies of the W-phase coil when viewed from the radially inner side.

In the W1-phase coil, first, the connection from the slot insertion portion having the slot number 1 to the slot insertion portion having the slot number 24 is performed so that the sets, each including two first winding bodies 21A, and the sets, each including two second winding bodies 21B, which are inserted into the slot group of the slots having the slot numbers {5+6(m-1)}, are alternately connected in series. Next, the connection from the slot insertion portion having the slot number 25 to the slot insertion portion having the slot number 48 is performed so that the sets, each including two first winding bodies 21A, and the sets, each including two second winding bodies 21B, which are inserted into the slot group of the slots having the slot numbers {6+6 (m-1)}, are alternately connected in series. In the manner described above, the W1-phase coil is formed by connecting the four winding bodies 21, that is, the first winding bodies 21A and the second winding bodies 21B inserted into the slot group of the slots having the slot numbers {5+6(m-1)} and the four winding bodies 21, that is, the first winding bodies 21A and the second winding bodies 21B inserted into the slot group of the slots having the slot numbers {6+6 (m-1)} in series. The seventh turn portion T6B extending from the sixth slot insertion portion S6 located in the sixth layer in the slot having the slot number 5 serves as the power feeding portion W1in of the W1-phase coil, and the seventh turn portion T6B extending from the sixth slot insertion portion S6 located in the sixth layer in the slot having the slot number 48 serves as a neutral point W1out.

In the W2-phase coil, first, the connection from the slot insertion portion having the slot number 101 to the slot insertion portion having the slot number 124 is performed so that the sets, each including two first winding bodies 21A, and the sets, each including two second winding bodies 21B, which are inserted into the slot group of the slots having the slot numbers {6+6 (m-1)}, are alternately connected in series. Next, the connection from the slot insertion portion having the slot number 125 to the slot insertion portion having the slot number 148 is performed so that the sets, each including two first winding bodies 21A, and the sets, each including two second winding bodies 21B, which are inserted into the slot group of the slots having the slot numbers { 5+6 (m-1)}, are alternately connected in series. In the manner described above, the W2-phase coil is formed by connecting the four winding bodies 21, that is, the first winding bodies 21A and the second winding bodies 21B inserted into the slot group of the slots having the slot numbers {5+6 (m-1)} and the four winding bodies 21, that is, the first winding bodies 21A and the second winding bodies 21B inserted into the slot group of the slots having the slot numbers {6+6 (m-1)} in series. The seventh turn portion T6B extending from the sixth slot insertion portion S6 located in the sixth layer in the slot having the slot number 6 serves as the power feeding portion W2in of the W2-phase coil, and the seventh turn portion T6B extending from the sixth slot insertion portion S6 located in the sixth layer in the slot having the slot number 47 serves as a neutral point W2out.

As described above, each of the W1-phase coil and the W2-phase coil is formed by serially connecting the four winding bodies 21 inserted into the slot group of the slots having the slot numbers {5+6 (m-1)} and the four winding bodies 21 inserted into the slot group of the slots having the slot numbers {6+6 (m-1)}. Specifically, the W1-phase coil and the W2-phase coil have the same configuration. The W-phase coil is formed by connecting the W1-phase coil and the W2-phase coil in parallel.

Figure 21:
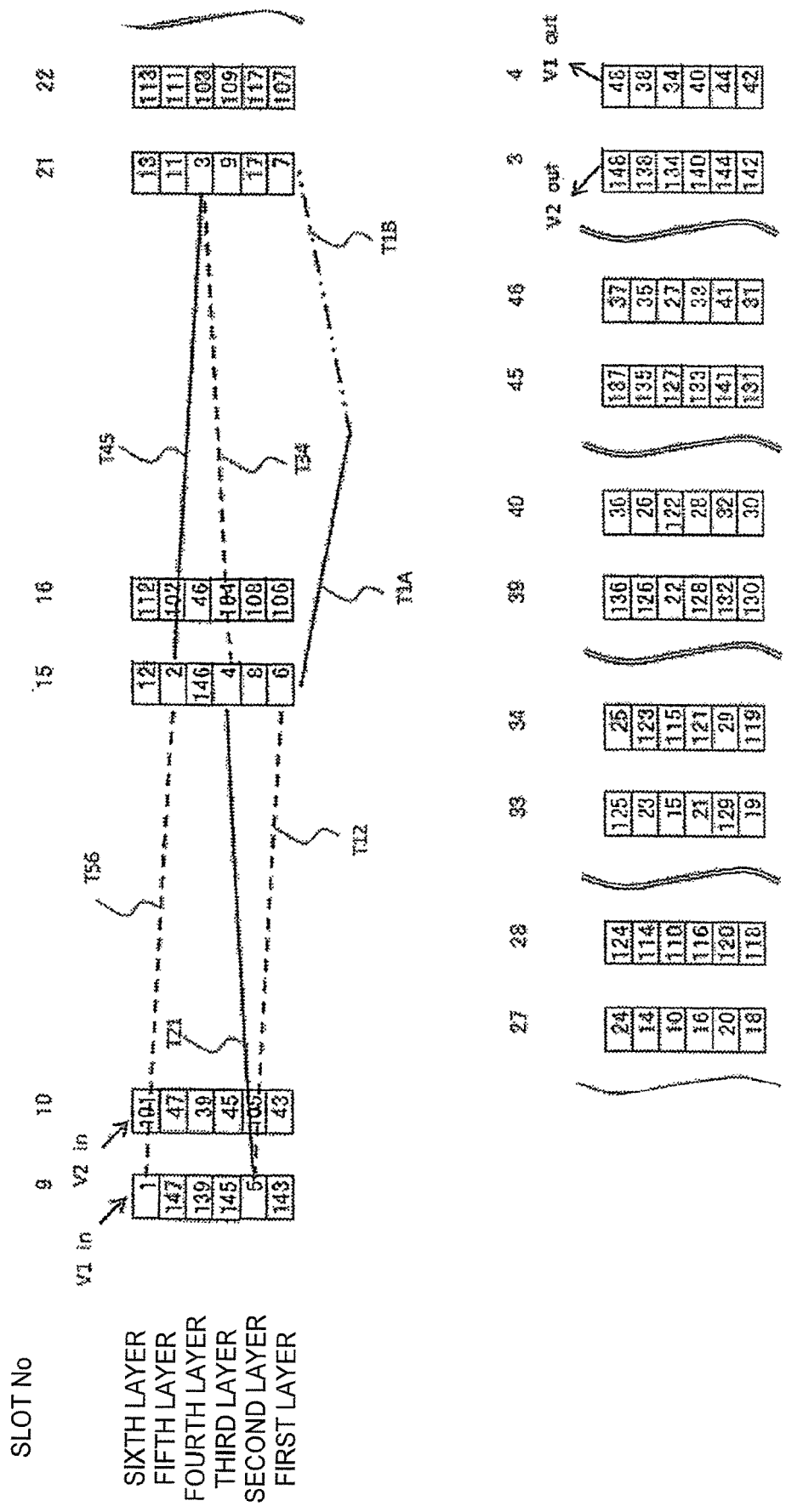
FIG. 21 is a diagram for illustrating a wire-connection pattern of a V-phase coil in the rotating electric machine according to the first embodiment of the present invention.
Figure 22:
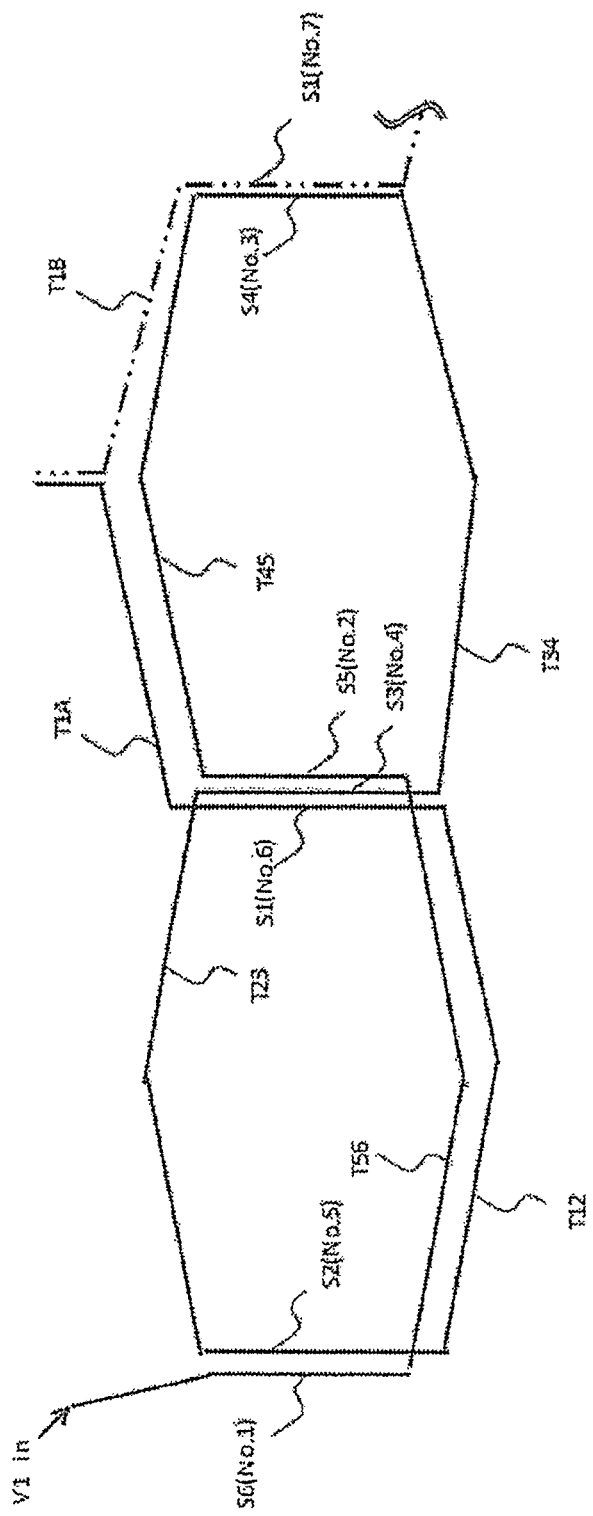
FIG. 22 is a schematic view of the winding bodies of the V-phase coil, when viewed from the radially inner side.

Next, a specific wire-connection pattern from the power feeding portion Win to a neutral point in the V-phase coil is described. FIG. 21 is a diagram for illustrating a wire-connection pattern of the V-phase coil in the rotating electric machine according to the first embodiment of the present invention, and FIG. 22 is a schematic view of the winding bodies of the V-phase coil when viewed from the radially inner side.

In the V1-phase coil, first, the connection from the slot insertion portion having the slot number 1 to the slot insertion portion having the slot number 24 is performed so that the sets, each including two first winding bodies 21A, and the sets, each including two second winding bodies 21B, which are inserted into the slot group of the slots having the slot numbers {3+6(m-1)}, are alternately connected in series. Next, the connection from the slot insertion portion having the slot number 25 to the slot insertion portion having the slot number 48 is performed so that the sets, each including two first winding bodies 21A, and the sets, each including two second winding bodies 21B, which are inserted into the slot group of the slots having the slot numbers { 4+6 (m-1)}, are alternately connected in series. In the manner described above, the V1-phase coil is formed by connecting the four winding bodies 21, that is, the first winding bodies 21A and the second winding bodies 21B inserted into the slot group of the slots having the slot numbers {3+6(m-1)} and the four winding bodies 21, that is, the first winding bodies 21A and the second winding bodies 21B inserted into the slot group of the slots having the slot numbers {4+6(m-1)} in series. The seventh turn portion T6B extending from the sixth slot insertion portion S6 located in the sixth layer in the slot having the slot number 9 serves as the power feeding portion V1in of the V1-phase coil, and the seventh turn portion T6B extending from the sixth slot insertion portion S6 located in the sixth layer in the slot having the slot number 4 serves as a neutral point V1out.

In the V2-phase coil, first, the connection from the slot insertion portion having the slot number 101 to the slot insertion portion having the slot number 124 is performed so that the sets, each including two first winding bodies 21A, and the sets, each including two second winding bodies 21B, which are inserted into the slot group of the slots having the slot numbers {4+6(m-1)}, are alternately connected in series. Next, the connection from the slot insertion portion having the slot number 125 to the slot insertion portion having the slot number 148 is performed so that the sets, each including two first winding bodies 21A, and the sets, each including two second winding bodies 21B, which are inserted into the slot group of the slots having the slot numbers {3+6(m-1)}, are alternately connected in series. In the manner described above, the V2-phase coil is formed by connecting the four winding bodies 21, that is, the first winding bodies 21A and the second winding bodies 21B inserted into the slot group of the slots having the slot numbers {3+6(m-1)} and the four winding bodies 21, that is, the first winding bodies 21A and the second winding bodies 21B inserted into the slot group of the slots having the slot numbers {4+6(m-1)} in series. The seventh turn portion T6B extending from the sixth slot insertion portion S6 located in the sixth layer in the slot having the slot number 101 serves as the power feeding portion V2in of the V2-phase coil, and the seventh turn portion T6B extending from the sixth slot insertion portion S6 located in the sixth layer in the slot having the slot number 3 serves as a neutral point V2out.

As described above, each of the V1-phase coil and the V2-phase coil is formed by serially connecting the four winding bodies 21 inserted into the slot group of the slots having the slot numbers {3+6(m-1)} and the four winding bodies 21 inserted into the slot group of the slots having the slot numbers {4+6(m-1)}. Specifically, the V1-phase coil and the V2-phase coil have the same configuration. The V-phase coil is formed by connecting the V1-phase coil and the V2-phase coil in parallel.

Figure 23:
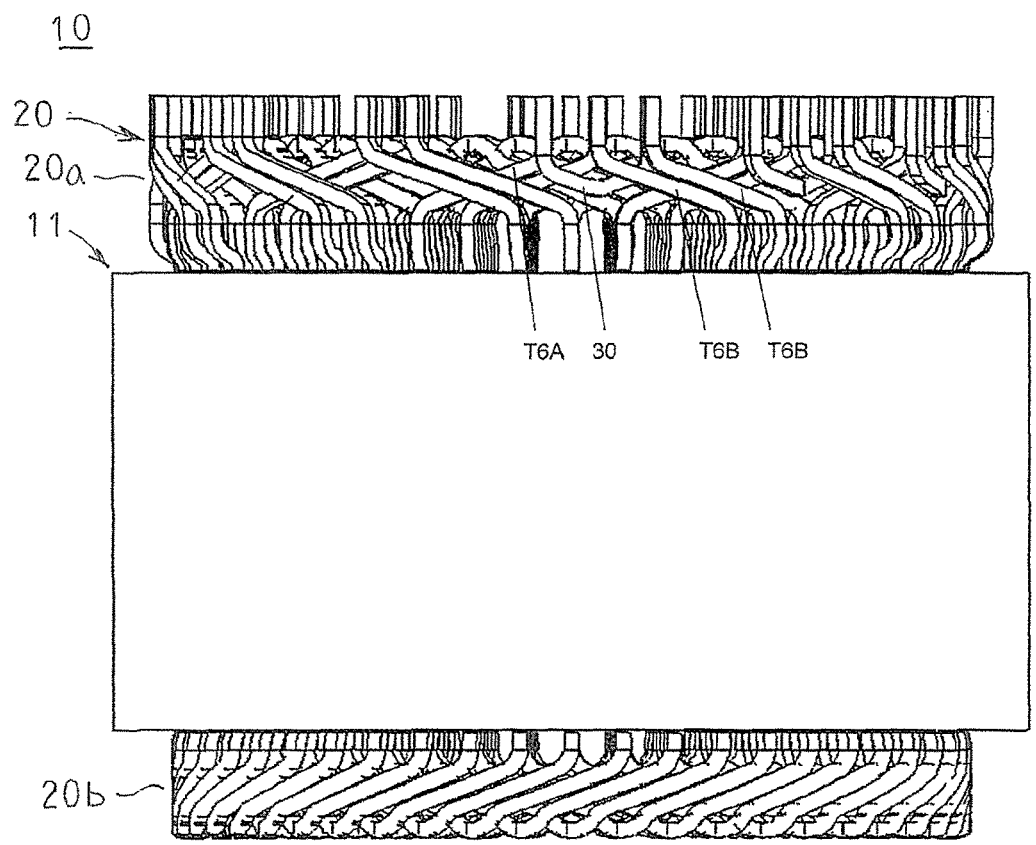
FIG. 23 is a side view for illustrating the stator in the rotating electric machine according to the first embodiment of the present invention.
Figure 24:
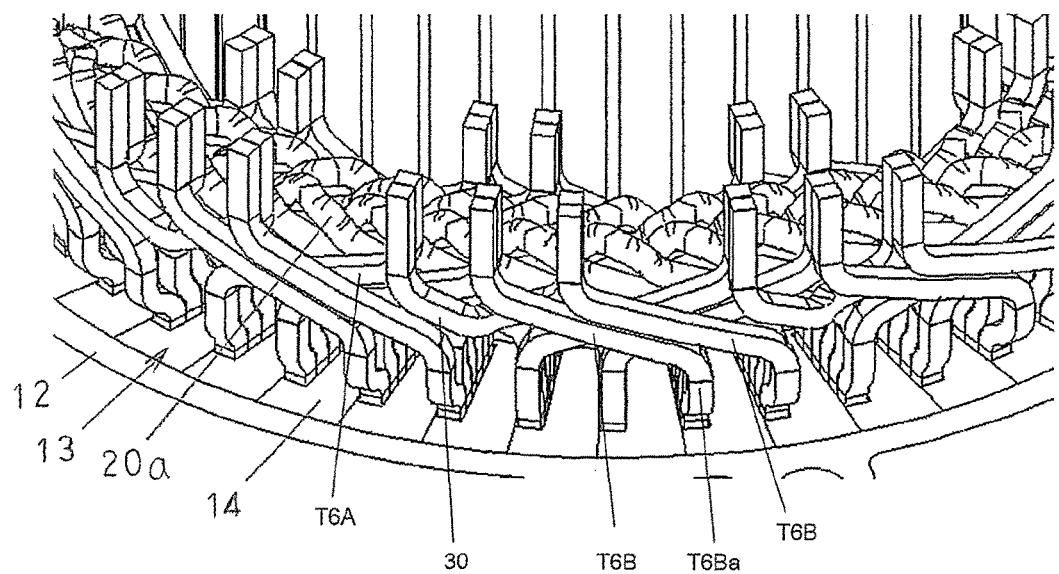
FIG. 24 is a perspective view for illustrating a main part of coil ends of the stator winding in the rotating electric machine according to the first embodiment of the present invention.
Figure 25:
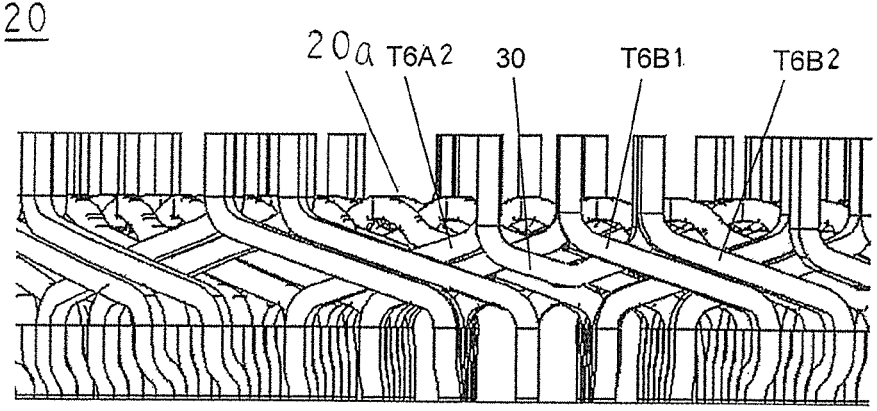
FIG. 25 is a side view of a main part, for illustrating a changed portion in an insertion slot group of the stator winding and a periphery thereof in the rotating electric machine according to the first embodiment of the present invention.
Figure 26:
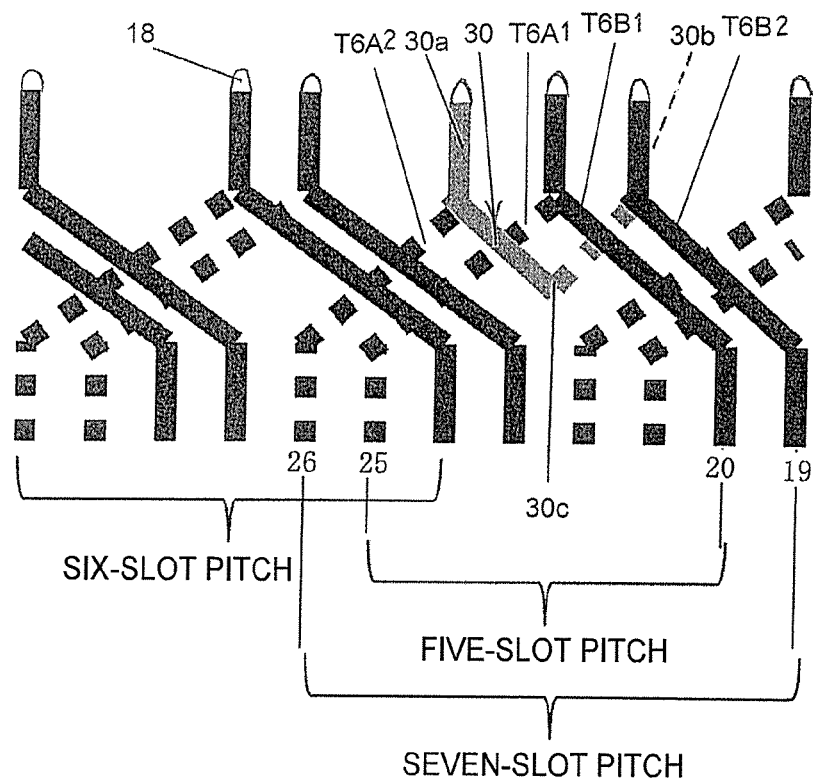
FIG. 26 is a schematic view for illustrating the changed portion in the insertion slot group of the stator winding and a periphery thereof in the rotating electric machine according to the first embodiment of the present invention.
Figure 27:
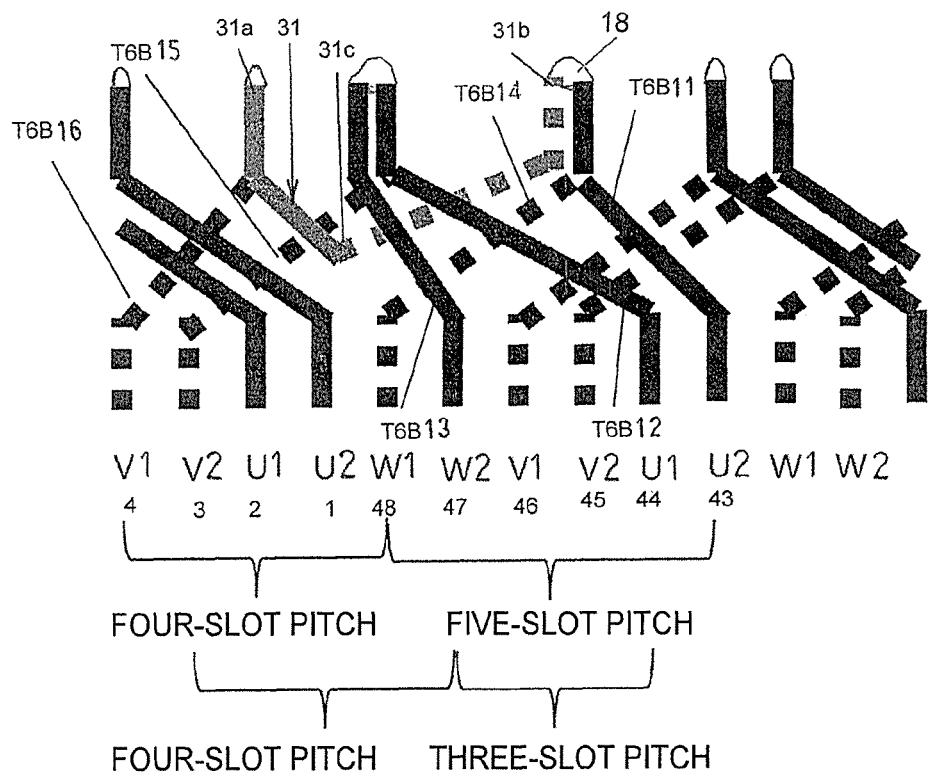
FIG. 27 is a schematic view for illustrating a neutral-point connecting portion of the stator winding and a periphery thereof in the rotating electric machine according to the first embodiment of the present invention.

Next, a connection structure for the winding bodies 21 is described with reference to FIG. 23 to FIG. 27. FIG. 23 is a side view for illustrating the stator in the rotating electric machine according to the first embodiment of the present invention. FIG. 24 is a perspective view of a main part of the coil ends of the stator winding in the rotating electric machine according to the first embodiment of the present invention. FIG. 25 is a side view of a main part, for illustrating a changed portion in an insertion slot group of the stator winding and a periphery thereof in the rotating electric machine according to the first embodiment of the present invention. FIG. 26 is a schematic view for illustrating the changed portion in the insertion slot group of the stator winding and a periphery thereof in the rotating electric machine according to the first embodiment of the present invention. FIG. 27 is a schematic view of a neutral-point connecting portion of the stator winding and a periphery thereof in the rotating electric machine according to the first embodiment of the present invention.

On the radially outer side of the first coil ends 20a, as illustrated in FIG. 23 and FIG. 24, the seventh turn portions T6A and T6B extending from the sixth layers in the slots 15 are arranged in the circumferential direction so that the direction of inclination of the oblique-side portion is set alternately opposite for each set of two seventh turn portions T6A and each set of the two seventh turn portions T6B. In each phase, a distal end portion of the seventh turn portion T6A and a distal end portion of the seventh turn portion T6B, which respectively have the oblique-side portions inclined in the opposite directions, are held in contact with each other in the radial direction except for a changed portion in the insertion slot group for the winding bodies 21 to be connected. The end of the seventh turn portion T6A and the end of the seventh turn portion T6B, which are held in contact with each other in the radial direction, are joined to each other through, for example, welding. In each phase, the changed portion in the insertion slot group for the winding bodies 21 to be connected is a portion at which an end portion of the seventh turn portion T6A and an end portion of the seventh turn portion T6B, which extend from the sixth slot insertion portions S6 being separate from each other by seven slots, are joined to each other and an end portion of the seventh turn portion T6A and an end portion of the seventh turn portion T6B, which extend from the sixth slot insertion portions S6 being separate from each other by five slots, are joined to each other.

The changed portion in the insertion slot group for the winding bodies 21 to be connected is described with reference to FIG. 25 and FIG. 26, taking the U-phase coil as an example. In FIG. 25 and FIG. 26, for convenience of the description, the seventh turn portions T6A and T6B extending from the sixth slot insertion portions S6, which are separate from each other by five slots, are denoted with the additional reference symbol 1, and the seventh turn portions T6A and T6B extending from the sixth slot insertion portions S6, which are separate from each other by seven slots, are denoted with the additional reference symbol 2.

In the U-phase coil, the end portion of the seventh turn portion T6B1 extending from the sixth slot insertion portion S6 inserted in the slot having the slot number 20 and the end portion of the seventh turn portion T6A1 extending from the sixth slot insertion portion S6 inserted in the slot having the slot number 25 are directly connected to each other through welding. Further, the end portion of the seventh turn portion T6A2 extending from the sixth slot insertion portion S6 inserted in the slot having the slot number 26 and the end portion of the seventh turn portion T6B2 extending from the sixth slot insertion portion S6 inserted in the slot having the slot number 19 are connected to each other through a bus bar 30. The seventh turn portion T6B2 corresponds to a first terminal, the seventh turn portion T6A2 corresponds to a second terminal, and the seventh turn portion T6B1 corresponds to a third terminal.

The bus bar 30 is formed in a U shape obtained by coupling a first end portion 30a and a second end portion 30b through an interconnecting portion, and is manufactured by bending the conductor wire 19 being a material of the winding bodies 21, which is cut into a predetermined length. The first end portion 30a and the second end portion 30b of the bus bar 30 are displaced from each other by a width of the conductor wire 19 at a crank portion 30c formed in the center of the interconnecting portion. A distal end portion of the seventh turn portion T6A1 is connected to a surface of a distal end portion of the seventh turn portion T6B1, which is oriented radially inward. The first end portion 30a of the bus bar 30 is connected to a surface of the seventh turn portion T6A2, which is oriented radially outward. Then, the bus bar 30 extends in the circumferential direction while maintaining a radial position to reach an axially inner side of the connecting portion for the seventh turn portions T6A1 and T6B1, and is displaced radially inward by the width of the conductor wire 19 at the crank portion 30c, and then passes on the radially inner side of the seventh turn portion T6B1 to extend in the circumferential direction while maintaining the radial position. Then, the second end portion 30b thereof is connected to a surface of a distal end portion of the seventh turn portion T6B2, which is oriented radially inward.

As described above, each of the U1-phase coil and the U2-phase coil is formed by serially connecting the four winding bodies 21 inserted into the slot group of the slots having the slot numbers {1+6(m-1)} and the four winding bodies 21 inserted into the slot group of the slots having the slot numbers {2+6(m-1)}. The V-phase coil and the W-phase coil are formed in the same manner, and hence the description thereof is herein omitted.

In the changed portion in the insertion slot group for the winding bodies 21 to be connected, the seventh turn portions T6A and T6B, which are separate from each other by five slots, are directly connected to each other, and the seventh turn portions T6A and T6B, which are separate from each other by seven slots, are connected through the bus bar 30. Each of the phase coils is formed by directly connecting the first turn portions T1A and T1B of the winding bodies 21 arranged at the six-slot pitches and the seventh turn portions T6A and T6B thereof.

Next, a coupling structure for the neutral points of the stator winding 20 is described with reference to FIG. 27. FIG. 27 is a schematic diagram for illustrating an arrangement state of the seventh turn portions of the stator winding in the rotating electric machine according to the first embodiment of the present invention. In FIG. 27, the slots are denoted by the slot numbers 43, 44, . . . , and 4. The seventh turn portions T6B for forming the neutral points are denoted with the additional reference symbols 11 to 16.

A distal end portion of a seventh turn portion T6B12 of the U1-phase coil, which extends from the sixth layer in the slot having the slot number 44, and a distal end portion of a seventh turn portion T6B13 of the W2-phase coil, which extends from the sixth layer in the slot having the slot number 47, are arranged so as to be held in contact with each other in the circumferential direction. A seventh turn portion T6B15 of the V2-phase coil, which extends from the sixth layer in the slot having the slot number 3, is inclined toward the seventh turn portion T6B12 of the U1-phase coil with elimination of the displacement at the crank portion T6Ba, and a distal end portion of the seventh turn portion T6B15 is brought into contact with a surface of the distal end portion of the seventh turn portion T6B12 of the U1-phase coil, which is oriented radially inward. Then, the distal end portion of the seventh turn portion T6B12 of the U1-phase coil, the distal end portion of the seventh turn portion T6B13 of the W2-phase coil, and the distal end portion of the seventh turn portion T6B15 of the V2-phase coil are joined together through winding to form a first neutral point.

A seventh turn portion T6B14 of the W1-phase coil, which extends from the sixth layer in the slot having the slot number 48, is inclined toward a seventh turn portion T6B11 of the U2-phase coil with elimination of the displacement at the crank portion T6Ba, and a distal end portion of a seventh turn portion T6B14 is brought into contact with a surface of the distal end portion of the seventh turn portion T6B11 of the U2-phase coil, which is oriented radially inward. Further, a second end portion 31b of a bus bar 31 is brought into contact with a circumferential side surface of the distal end portion of the seventh turn portion T6B14 of the W1-phase coil.

Then, the distal end portion of the seventh turn portion T6B14 of the W1-phase coil, a distal end portion of the seventh turn portion T6B11 of the U2-phase coil, and the second end portion 31b of the bus bar 31 are connected to each other through welding. Further, a seventh turn portion T6B16 of the V1-phase coil, which extends from the sixth layer in the slot having the slot number 4, is inclined toward the seventh turn portion T6B13 of the W2-phase coil, which extends from the sixth layer in the slot having the slot number 47, with elimination of the displacement at the crank portion T6Ba, and a distal end portion of the seventh turn portion T6B16 is brought into contact with a radially inner surface of a first end portion 31a of the bus bar 31. Then, the distal end portion of the seventh turn portion T6B15 of the V1-phase coil and the first end portion 31a of the bus bar 31 are joined to each other through welding to form a second neutral point.

The bus bar 31 is formed in a U shape obtained by coupling a first end portion 31a and a second end portion 31b through an interconnecting portion, and is manufactured by bending the conductor wire 19 being a material of the winding bodies 21, which is cut into a predetermined length. The first end portion 31a and the second end portion 31b of the bus bar 31 are displaced from each other by a width of the conductor wire 19 at a crank portion 31c formed in the center of the interconnecting portion. Thus, the first end portion 31a of the bus bar 31 is connected to a surface of the distal end portion of the seventh turn portion T6B16 of the V1-phase coil, which is oriented radially outward. Then, the bus bar 31 extends in the circumferential direction while maintaining a radial position to reach an axially inner side of a connecting portion for the seventh turn portion T6B15 of the V2-phase coil, the seventh turn portion T6B13 of the W2-phase coil, and the seventh turn portion T6B12 of the U1-phase coil, and is displaced at the crank portion 31c to the radially inner side by the width of the conductor wire 19, and then passes on the radially inner side of the seventh turn portion T6B13 of the W2-phase coil and the seventh turn portion T6B12 of the U1-phase coil to extend in the circumferential direction while maintaining the radial position. Then, the second end portion 31b of the bus bar 31 is connected to a surface of the distal end portion of the seventh turn portion T6B14 of the W1-phase coil, which is oriented in the circumferential direction.

As described above, the neutral points of the U-phase coil, the V-phase coil, and the W-phase coil are connected by wire connection to form the stator winding 20 illustrated in FIG. 16. In the neutral-point wire-connection portion, as illustrated in FIG. 27, the seventh turn portions T6B being separate by three slots, those being separate by four slots, those being separate by five slots, and those being separate by seven slots, are directly connected to each other. The seventh turn portions T6B, which are separate from each other by nine slots, are connected through the bus bar 31. The seventh turn portion T6B11 corresponds to the first terminal, the seventh turn portion T6B16 corresponds to the second terminal, the seventh turn portion T6B12 (T6B13) corresponds to the third terminal, and the seventh turn portion T6B14 corresponds to a fourth terminal.

Each of the U1-phase coil and the U2-phase coil, which are connected in parallel, is formed by serially connecting the four winding bodies 21 inserted into the slot group of the slots having the slot numbers {1+6(m-1)} and connecting the four winding bodies 21 inserted into the slot group of the slots having the slot numbers {2+6(m-1)}. Each of the V1-phase coil and the V2-phase coil, which are connected in parallel, is formed by serially connecting the four winding bodies 21 inserted into the slot group of the slots having the slot numbers {3+6(m-1)} and the four winding bodies 21 inserted into the slot group of the slots having the slot numbers {4+6(m-1)}. Each of the W1-phase coil and the W2-phase coil, which are connected in parallel, is formed by serially connecting the four winding bodies 21 inserted into the slot group of the slots having the slot numbers {5+6(m-1)} and the four winding bodies 21 inserted into the slot group of the slots having the slot numbers {6+6(m-1)}. As described above, in the V-phase coil and the W-phase coil, the coils to be connected in parallel have the same configuration. Thus, generation of a circulating current is suppressed.

According to the first embodiment, the sets, each including two first winding bodies 21A, and the sets, each including two second winding bodies 21B, are mounted to the stator core 11 so as to be arranged alternately in the circumferential direction. As a result, as illustrated in FIG. 14, the sets, each including two first turn portions T1A, and the sets, each including two first turn portions T1B, are arranged alternately. Thus, the sets, each including two first turn portions T1A, and the sets, each including two first turn portions T1B, are arranged so that the direction of inclination of the oblique-side portion becomes opposite for each set. As a result, in each set, two joint portions 18, each for joining the end portion of the first turn portion T1A and the end portion of the first turn portion T1B, are arranged so as to be separate from each other by the one-slot distance. The above-mentioned sets are arranged in the circumferential direction at four-slot distances.

Similarly, in each set, two joint portions 18, each for joining the end portion of the seventh turn portion T6A and the end portion of the seventh turn portion T6B, are arranged so as to be separate from each other by the one-slot distance. The above-mentioned sets are arranged in the circumferential direction at four-slot distances.

Thus, the number of joint portions 18 arranged adjacent to each other in the circumferential direction is reduced to improve an insulating property. Further, at the time of joint, a space for chucking the first turn portions T1A and T1B and the seventh turn portions T6A and T6B can be ensured to enable enhancement of productivity. The first turn portions T1A and T1B arranged on the radially inner side of the first coil ends 20a are joined to each other and the seventh turn portions T6A and T6B arranged on the radially outer side of the first coil ends 20a are joined to each other to thereby form the phase winding. Thus, increase in axial dimension, specifically, axial length of the stator winding 20 can be suppressed. Further, among the first turn portions T1A and T1B and the seventh turn portions T6A and T6B, the turn portions of the same phase, which are adjacent to each other in the circumferential direction, are bent in the same direction, and the turn portions of different phases are bent in the directions opposite to each other. Thus, a distance between the conductor wires 19 of different phases is increased to reduce an insulation coating for the conductor wire 19. In this manner, a higher output is achieved.

In each phase coil, one of the coils to be connected in parallel is formed in the following manner. When eight winding bodies 21 are connected, first to fourth winding bodies 21 inserted into one of the slot groups are connected, and the fifth and subsequent winding bodies 21 inserted into another one of the slot groups are connected. Further, another one of the coils to be connected in parallel is formed in the following manner. When eight winding bodies 21 are connected, first to fourth winding bodies 21 inserted into the another one of the slot groups are connected, and the fifth and subsequent winding bodies 21 inserted into the one of the slot groups are connected. In this manner, in each phase coil, the two coils to be connected in parallel have the same configuration. Thus, the generation of the circulating current can be suppressed.

In the changed portion in the insertion slot group, the distal end portion of the seventh turn portion T6A1 and the distal end portion of the seventh turn portion T6B1, which extend from the slot insertion portions being separate from each other by five slots, are directly connected, and the distal end portion of the seventh turn portion T6a2 and the distal end portion of the seventh turn portion T6B2, which extend from the slot insertion portions being separate from each other by seven slots, are directly connected with use of the bus bar 30. The bus bar 30 is formed in the U shape having the interconnecting portion including the crank portion 30c. The bus bar 30 passes on the radially inner side of the seventh turn portion T6B1 on the stator core 11 side of the connecting portion for the distal end portions of the seventh turn portions T6A1 and T6B1 to be connected to the distal end portions of the seventh turn portions T6A1 and T6B2. Accordingly, the bus bar 30 does not protrude to the radially outer side of the seventh turn portion T6B1 to suppress increase in radial dimension of the coil ends. As a result, downsizing of the stator 10 in the radial direction is achieved. The bus bar 30 passes on the radially inner side of the seventh turn portion T6B1. Thus, radially outward movement of the bus bar 30 can be restricted. As a result, positioning of the bus bar 30 is facilitated to thereby enhance the productivity.

In the neutral-point wire-connection portion of the stator winding 20, the distal end portion of the seventh turn portion T6B14 of the W1-phase coil and the distal end portion of the seventh turn portion T6B11 of the U2-phase coil, and the distal end portion of the seventh turn portion T6B16 of the V1-phase coil are arranged separately on both circumferential sides of the connecting portion for the seventh turn portion T6B12 of the U1-phase coil, the seventh turn portion T6B13 of the W2-phase coil, and the seventh turn portion T6B15 of the V2-phase coil. Thus, the distal end portion of the seventh turn portion T6B14 of the W1-phase coil and the distal end portion of the seventh turn portion T6B11 of the U2-phase coil, and the distal end portion of the seventh turn portion T6B16 of the V1-phase coil are connected to each other with use of the bus bar 31. The bus bar 31 is formed in the U shape having the crank portion 31c in the interconnecting portion, and passes on the radially inner side of the seventh turn portion T6B12 of the U1-phase coil and the seventh turn portion T6B13 of the W2-phase coil to be connected to the distal end portion of the seventh turn portion T6B14 of the W1-phase coil, the distal end portion of the seventh turn portion T6B11 of the U2-phase coil, and the distal end portion of the seventh turn portion T6B16 of the V1-phase coil. Accordingly, the bus bar 31 does not protrude to the radially outer side of the seventh turn portions T6B12 and T6B13 to suppress increase in radial dimension of the coil ends. As a result, downsizing of the stator 10 in the radial direction is achieved. The bus bar 31 passes on the radially inner side of the seventh turn portions T6B12 and T6B13. Thus, radially outward movement of the bus bar 31 can be restricted. As a result, positioning of the bus bar 31 is facilitated to thereby enhance the productivity.

In this case, the number of slots per phase for each pole is two and the stator winding is formed by wire connection of the phase coils, each being formed by connecting two coils in parallel, in the Y-connection configuration. Thus, two neutral points are formed. Thus, in the connecting portion for the neutral points, three terminals extending from the slots 15, which are separate from each other by six slots, are not connected to each other. Instead, as illustrated in FIG. 27, three terminals extending from the slots 15, which are separate by four slots and five slots, are connected, and three terminals extending from the slots 15, which are separate by four slots and three slots, are connected. The six slots corresponds to: number of slots (2) per phase for each pole×number of phases (3) of stator winding.

In the first embodiment, the three terminals for forming the first neutral point, which extend from the slots 15 being separate by four slots and three slots, are directly joined together. Then, among the three terminals for forming the second neutral point, which extend from the slots 15 being separate by four slots and five slots, two terminals extending from the slots 15 being separate from each other by five slots are directly joined to each other. Then, the thus joined two terminals and the remaining one terminal are joined together with use of the bus bar 31. As described above, an auxiliary component such as a wire connection plate is not needed. Thus, the number of components is reduced to enhance the productivity. At the same time, downsizing of the coil ends is achieved. Further, welding is performed at three positions, and hence the productivity is enhanced.

The interconnecting portion of the bus bar 30 is located on the stator core 11 side of the connecting portion for the distal end portion of the seventh turn portion T6A1 and the distal end portion of the seventh turn portion T6B1 or the interconnecting portion of the bus bar 31 is located on the stator core 11 side of the connecting portion for the distal end portion of the seventh turn portion T6B12, the distal end portion of the seventh turn portion T6B13, and the distal end portion of the seventh turn portion T6B15. Specifically, the interconnecting portions are located on the radially outer side and below tops of the first coil ends 20a in the axial direction. Thus, as compared to a case in which the bus bars are arranged above the first coil ends 20a in the axial direction, the axial dimension of the coil ends can be shortened, thereby achieving the downsizing of the stator 10 in the axial direction.

The winding bodies 21 and the bus bars 30 and 31 are made of the same material. Thus, the productivity is enhanced. Each of the bus bars 30 and 31 is formed of the conductor wire 19 that is insulation-coated. Thus, the insulating property between the bus bars 30 and 31 and the winding bodies 21 is ensured.

In the first embodiment, the number of slots N per phase for each pole is two and the number of phases P of the stator winding 20 is three. Thus, each phase coil is formed by connecting the first turn portions to each other and the seventh turn portions to each other, which extend from the slots being separate from each other by 6 (=2×3) slots.

Specifically, in the changed portion in the insertion slot group for each phase coil and the neutral-point wire-connection portion, the seventh turn portions, which are separate from each other by M slots except for six slots, are connected to each other. In the changed portion in the insertion slot group for each phase coil, as illustrated in FIG. 26, the seventh turn portions T6A1 and T6B1 extending from the slots 15 being separate from each other by five slots are required to be connected to each other, and the seventh turn portions T6A1 and T6B2 extending from the slots being separate from each other by seven slots are required to be connected to each other. The seventh turn portions T6A1 and T6B1 extending from the slots 15 being separate from each other by five slots can be directly connected without changing an offset shape in the radial direction. However, in order to directly connect the seventh turn portions T6A2 and T6B2 extending from the slots 15 being separate from each other by seven slots, an offset shape of the seventh turn portions T6A2 and T6B2 in the radial direction is required to be changed so as to avoid interference with the seventh turn portions T6A1 and T6B1. In the first embodiment, with adjustment of a length of the interconnecting portion of the bus bar 30, the distal end portion of the seventh turn portion T6A2 and the distal end portion of the seventh turn portion T6B2 can be connected to each other without changing the offset shape of the seventh turn portions T6A2 and T6B2 in the radial direction. Thus, a jig and a step for forming the offset shape of the winding bodies 21 in the radial direction are not required to be changed for each machine type. Thus, the productivity is enhanced.

In this case, when M is a natural number equal to or larger than 2 other than N×P, the effect of elimination of the need of changing the offset shape of the seventh turn portions T6A2 and T6B2 in the radial direction is obtained with use of the bus bar 30.

In the winding bodies 21 according to the first embodiment described above, the radial positions of the sixth to first slot insertion portions S6 to S1 in the slot are sequentially displaced by one layer from the radially outer side to the radially inner side. At the same time, in FIG. 12, a direction of the turn portion for connecting a Q-th slot insertion portion and a (Q-1)-th slot insertion portion to each other in a direction from the Q-th slot insertion portion to the (Q-1)-th slot insertion portion is in the order of "right, right, left, left, right". However, when the radial positions of the sixth to the first slot insertion portions S6 to S1 are sequentially displaced by one layer from the radially outer side to the radially inner side, the direction of the turn portion for connecting the Q-th slot insertion portion and the (Q-1)-th slot insertion portion to each other from the Q-th slot insertion portion to the (Q-1)-th slot insertion portion may be in appropriate order. For example, the direction of the turn portion for connecting the Q-th slot insertion portion and the (Q-1)-th slot insertion portion to each other from the Q-th slot insertion portion to the (Q-1)-th slot insertion portion may be in the order of "right, left, right, left, right" or "right, right, right, right, right".

Further, in the first embodiment described above, at the second neutral point, the distal end portion of the seventh turn portion T6B14 of the W1-phase coil is directly connected to the distal end portion of the seventh turn portion T6B11 of the U2-phase coil. However, the distal end portion of the seventh turn portion T6B14 of the W1-phase coil may be directly connected to the distal end portion of the seventh turn portion T6B16 of the V1-phase coil.

Second Embodiment

Figure 28:
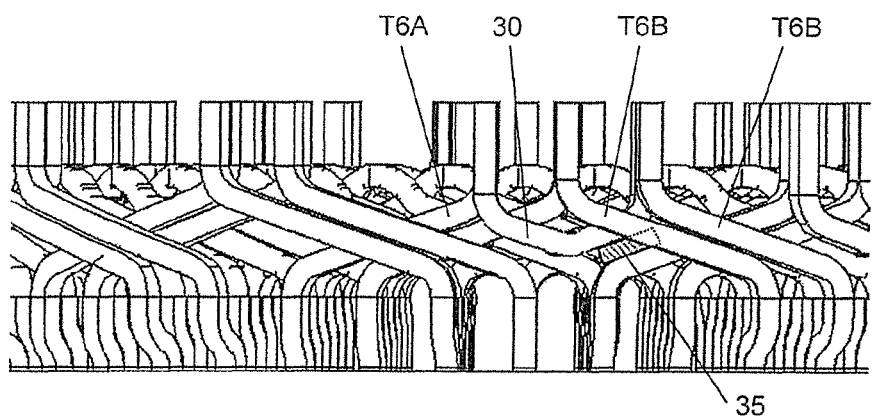
FIG. 28 is a side view of a main part, for illustrating a stator in a rotating electric machine according to a second embodiment of the present invention, when viewed from a radially outer side.
Figure 29:
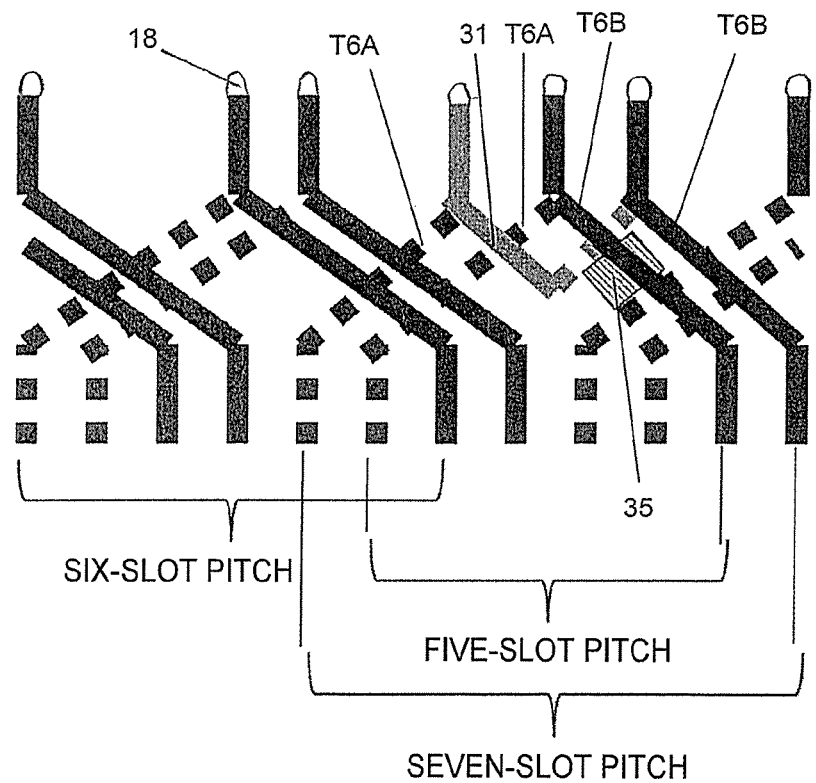
FIG. 29 is a schematic view for illustrating an arrangement state of seventh turn portions of a stator winding in the rotating electric machine according to the second embodiment of the present invention.
Figure 30:
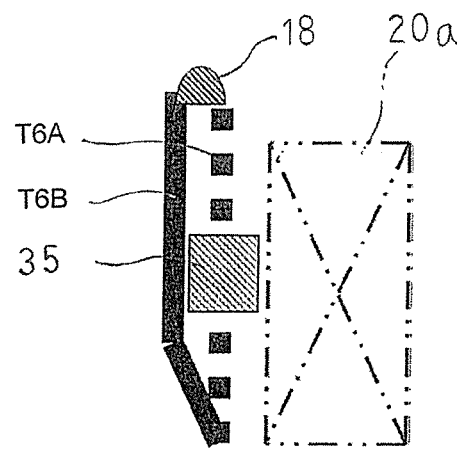
FIG. 30 is a schematic view for illustrating the arrangement state of the seventh turn portions of the stator winding in the rotating electric machine according to the second embodiment of the present invention.

FIG. 28 is a side view of a main part of the stator in the rotating electric machine according to the second embodiment of the present invention, when viewed from the radially outer side. FIG. 29 and FIG. 30 are each a schematic view for illustrating an arrangement state of seventh turn portions of the stator winding in the rotating electric machine according to the second embodiment of the present invention.

As illustrated in FIG. 28 to FIG. 30, a temperature detection element 35 such as a thermistor is mounted to the bus bar 30 so as to be arranged between the bus bar 30 and the seventh turn portion T6A.

Other configurations are the same as those in the first embodiment.

According to the second embodiment, the temperature detection element 35 is arranged in a circumferential gap between the bus bar 30 and the seventh turn portion T6A. Hence, responsiveness of temperature detection of the temperature detection element 35 is improved. Further, one circumferential surface of the temperature detection element 35 is held in contact with the bus bar 30 being a heat generating body. Thus, an influence of an atmospheric temperature is suppressed, and hence a variation in detected temperature can be reduced.

Further, the temperature detection element 35 is mounted to the bus bar 30. Thus, the seventh turn portions T6A and T6B can be connected to each other with use of the bus bar 30 to which the temperature detection element 35 is mounted. Thus, complicated work of mounting the temperature detection element 35 to the bus bar 30 connected to the seventh turn portions T6A and T6B is not required. As a result, the productivity is enhanced.

In this case, when another circumferential surface of the temperature detection element 35 is held in contact with the seventh turn portion T6A, the responsiveness of the temperature detection is further improved. At the same time, the influence of the atmospheric temperature is further suppressed, and hence the variation in detected temperature can be further reduced. Further, the temperature detection element 35 may be arranged so as to be opposed to a radially inner surface of the seventh turn portion T6B across which the bus bar 30 traverses. As a result, two radial surfaces of the temperature detection element 35 are brought closer to or brought in contact with the seventh turn portion T6B and the fifth turn portion T45 of the first coil end 20a. Thus, the responsiveness of the temperature detection is further improved. At the same time, the influence of the atmospheric temperature is further suppressed, and hence the variation in detected temperature can be further reduced.

Further, in the second embodiment, the temperature detection element 35 is mounted to the bus bar 30. However, the temperature detection element 35 may be mounted to the bus bar 31.

In each of the embodiments described above, the rotating electric machine having eight poles and forty-eight slots has been described. However, the number of poles and the number of slots are not limited thereto.

Further, in each of the embodiments described above, the stator winding is formed by wire connection of the phase coils, each being formed by parallel connection, in the Y-connection configuration. However, the stator winding may be formed by wire connection of the phase coils, each being formed by serial connection, in the Y-connection configuration.

Further, in each of the embodiments described above, the stator winding is formed by wire connection of the phase coils in the Y-connection configuration. However, the stator winding may be formed by wire connection of the phase coils in a Δ-connection configuration.

Further, in each of the embodiments described above, the present invention is applied to the rotating electric machine, which has two slots per phase for each pole and includes the stator winding formed by distributed winding. However, the rotating electric machine is only required to have N or more (N is a natural number equal to or larger than 2) slots per phase for each pole and include a stator winding formed by distributed winding.

Further, in each of the embodiments described above, the radially outer-side terminals extending from the radially outermost positions in the slots are joined to each other with use of the bus bar. However, the radially inner-side terminals extending from the radially innermost positions in the slots may be joined to each other with use of the bus bar. In this case, the crank portion of the bus bar is only required to be formed to be included in the interconnecting portion so that the interconnecting portion passes on the radially outer side of the radially inner-side terminal corresponding to the third terminal.

In each of the embodiments described above, the winding body is formed of one continuous conductor wire. However, the winding body may be formed with use of a plurality of conductors connected to each other as long as distributed winding is used.

Further, in each of the embodiments described above, the winding body corresponding to the coil is formed by alternately connecting eight coil insertion portions and nine turn portions in a continuous manner. However, the winding body is only required to be formed by alternately connecting 2X (X is a natural number equal to or larger than 1) and (2X+1) turn portions in a continuous manner. In this case, the turn portions located at both ends of the winding body correspond to the radially inner-side terminal and the radially outer-side terminal, respectively.

REFERENCE SIGNS LIST 10 stator, 11 stator core, 15 slot, 19 conductor wire, 20 stator winding, 21 winding body (coil), 21A first winding body (coil), 21B second winding body (coil), 30, 31 bus bar, 30a, 31a first end portion, 30b, 31b second end portion, 30c, 31c crank portion, 35 temperature detection element, S1 first slot insertion portion, S2 second slot insertion portion, S3 third slot insertion portion, S4 fourth slot insertion portion, S5 fifth slot insertion portion, S6 sixth slot insertion portion, T1A, T1B first turn portion (radially inner-side terminal), T12 second turn portion, T23 third turn portion, T34 fourth turn portion, T45 fifth turn portion, T56 sixth turn portion, T6A, T6B seventh turn portion (radially outer-side terminal)

The invention claimed is:
1. A rotating electric machine comprising a stator,
the stator including:
a stator core having an annular shape, which has a plurality of slots formed in a circumferential direction of the stator core; and
a stator winding mounted to the stator core,
wherein the stator winding includes a plurality of coils formed by distributed winding, each being made of a conductor that is insulation-coated,
wherein each of the plurality of coils includes:
2X (X is a natural number equal to or larger than 1) slot insertion portions inserted into the slots;
(2X-1) turn portions configured to connect the 2X slot insertion portions alternately on one axial end side and another axial end side of the stator core to continuously couple the 2X slot insertion portions;

radially inner-side terminals, each extending from the slot insertion portion located at one end of the continuously coupled slot insertion portions; and radially outer-side terminals, each extending from the slot insertion portion located at another end of the continuously coupled slot insertion portions, wherein the radially inner-side terminals extend from radially innermost positions in the slots in a one-by-one manner, wherein the radially outer-side terminals extend from radially outermost positions in the slots in a one-by-one manner, wherein the 2X slot insertion portions are respectively inserted into the slots so as to be arranged in one row in a radial direction of the stator core, wherein a first terminal and a second terminal extend from two of the slots, which are separate from each other in the circumferential direction, and a third terminal extends from one of the slots, which is located between the two slots, the first terminal, the second terminal, and the third terminal each being any one of the radially inner-side terminal and the radially outer-side terminal, wherein the first terminal and the second terminal are connected to each other with use of a bus bar; and wherein the bus bar has:
 a first end portion to be connected to a distal end portion of the first terminal;
 a second end portion to be connected to a distal end portion of the second terminal; and
 an interconnecting portion configured to couple the first end portion and the second end portion to each other, which is arranged in the circumferential direction on the stator core side of the first end portion and the second end portion so as to pass on the slot side of the third terminal.

2. The rotating electric machine according to claim 1, wherein the interconnecting portion has a crank portion configured to shift the first end portion and the second end portion from each other in the radial direction.

3. The rotating electric machine according to claim 1, wherein the bus bar is made of the conductor that is insulation-coated.

4. The rotating electric machine according to claim 1, wherein the slots are formed so that N (N is a natural number equal to or larger than 2) slots are formed per phase for each pole, wherein the stator winding comprises a three-phase winding, and wherein the two slots are separate from each other in the circumferential direction by M1 slots (M1 is a natural number equal to or larger than 2 except for 3N).

5. The rotating electric machine according to claim 4, further comprising a fourth terminal extending from one of the slots, which is located between the two slots, and is different from the slot from which the third terminal extends, wherein the slot from which the fourth terminal extends is separate from one of the two slots in the circumferential direction by M2 slots (M2 is a natural number equal to or larger than 2 except for 3N) and is separate from another one of the two slots in the circumferential direction by M3 slots (M3 is a natural number equal to or larger than 2 except for 3N), and wherein a distal end portion of the fourth terminal is directly connected to the distal end portion of the first terminal or the distal end portion of the second terminal.

6. The rotating electric machine according to claim 5, wherein the first terminal, the second terminal, and the fourth terminal form a neutral point of the stator winding.

7. The rotating electric machine according to claim 1, further comprising a temperature detection element mounted to the bus bar.

8. The rotating electric machine according to claim 7, wherein the temperature detection element is disposed between the bus bar and the radially inner-side terminal or the radially outer-side terminal, which is adjacent to the bus bar in the circumferential direction.

9. The rotating electric machine according to claim 8, wherein the temperature detection element is disposed so as to be opposed to a surface of the third terminal, which is oriented toward the slot.

* * * * *